United States Patent
Yasui

(10) Patent No.: US 8,140,174 B2
(45) Date of Patent: *Mar. 20, 2012

(54) DEVICE AND METHOD FOR CONTROLLING A PLANT BY USING AN IDENTIFIER FOR PARTIALLY IDENTIFYING A MODEL PARAMETER

(75) Inventor: Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 430 days.

This patent is subject to a terminal disclaimer.

(21) Appl. No.: 10/570,385

(22) PCT Filed: Sep. 30, 2004

(86) PCT No.: PCT/JP2004/014771
§ 371 (c)(1),
(2), (4) Date: Nov. 30, 2006

(87) PCT Pub. No.: WO2005/033808
PCT Pub. Date: Apr. 14, 2005

(65) Prior Publication Data
US 2007/0168054 A1    Jul. 19, 2007

(30) Foreign Application Priority Data

Oct. 3, 2003 (JP) ................................ 2003-346239

(51) Int. Cl.
G05B 13/02 (2006.01)
G06F 17/10 (2006.01)

(52) U.S. Cl. ............... 700/31; 700/34; 700/37; 703/2

(58) Field of Classification Search ............ 700/28–34, 700/37, 52, 53, 83; 60/285, 906; 123/337, 123/376, 398, 568.11, 568.19; 701/85, 86, 701/103, 108; 703/2
See application file for complete search history.

(56) References Cited

U.S. PATENT DOCUMENTS

| | | | | | |
|---|---|---|---|---|---|
| 4,133,011 | A | * | 1/1979 | Kurzweil, Jr. | 360/78.09 |
| 5,535,177 | A | * | 7/1996 | Chin et al. | 367/81 |
| 5,724,239 | A | * | 3/1998 | Kaneko | 700/29 |
| 5,797,261 | A | * | 8/1998 | Akazaki et al. | 60/276 |
| 5,852,930 | A | * | 12/1998 | Yasui et al. | 60/276 |
| 5,880,952 | A | * | 3/1999 | Yasui et al. | 700/28 |

(Continued)

FOREIGN PATENT DOCUMENTS

JP        03-031902 A     2/1991

(Continued)

Primary Examiner — Albert DeCady
Assistant Examiner — Jennifer Norton
(74) Attorney, Agent, or Firm — Arent Fox LLP

(57) ABSTRACT

A control apparatus that can partially identify model parameters is provided. The apparatus for controlling an object that is modeled using at least one first model parameter and at least one second model parameter comprises a partial model parameter identifier for recursively identifying the second model parameter based on an output from the object and an input into the object, and a controller for using the first model parameter that is pre-identified and the second model parameter identified by the partial model parameter identifier to determine an input into the controller so that the output from the object converges to a desired value. Since all model parameters are not required to be recursively identified, the time for causing the model parameters to converge to optimal values can be shortened. The computational complexity for the identifier can be reduced.

20 Claims, 19 Drawing Sheets

U.S. PATENT DOCUMENTS

| | | | |
|---|---|---|---|
| 5,959,861 A * | 9/1999 | Kaneko | 700/29 |
| 6,049,738 A * | 4/2000 | Kayama et al. | 700/29 |
| 6,056,781 A * | 5/2000 | Wassick et al. | 703/12 |
| 6,230,486 B1 * | 5/2001 | Yasui et al. | 60/285 |
| 6,321,159 B1 * | 11/2001 | Nohtomi et al. | 701/207 |
| 6,367,245 B1 * | 4/2002 | Yasui et al. | 60/277 |
| 6,859,717 B2 * | 2/2005 | Yasui et al. | 701/99 |
| 6,950,741 B2 * | 9/2005 | Ishikawa et al. | 701/110 |
| 6,990,402 B2 * | 1/2006 | Yasui et al. | 701/108 |
| 7,050,864 B2 * | 5/2006 | Yasui et al. | 700/31 |
| 7,058,501 B2 * | 6/2006 | Yasui et al. | 701/102 |
| 7,324,931 B1 * | 1/2008 | Warlock | 703/13 |
| 7,933,755 B1 * | 4/2011 | Warlock | 703/6 |
| 2002/0049526 A1 | 4/2002 | Kawai et al. | |
| 2003/0009240 A1 * | 1/2003 | Yasui et al. | 700/40 |
| 2003/0033075 A1 * | 2/2003 | Yasui et al. | 701/109 |
| 2003/0187564 A1 | 10/2003 | Yasui et al. | |
| 2004/0040283 A1 * | 3/2004 | Yasui et al. | 60/276 |
| 2004/0260412 A1 * | 12/2004 | Yasui et al. | 700/86 |

FOREIGN PATENT DOCUMENTS

| | | |
|---|---|---|
| JP | 11-219205 A | 8/1999 |
| JP | 2001-109504 A | 4/2001 |
| JP | 2001-283544 A | 10/2001 |
| JP | 2003-15703 A | 1/2003 |
| JP | 2003-015703 A | 1/2003 |
| JP | 2003005804 A * | 1/2003 |
| JP | 2003-50604 A | 2/2003 |
| JP | 2003-150205 A | 5/2003 |
| JP | 2003-172183 A | 6/2003 |
| WO | WO 02/086630 A1 * | 10/2002 |

* cited by examiner

DEVICE AND METHOD FOR CONTROLLING A PLANT BY USING AN IDENTIFIER FOR PARTIALLY IDENTIFYING A MODEL PARAMETER

CROSS-REFERENCE TO RELATED APPLICATION

This application is a National Stage entry of International Application No. PCT/JP2004/014771, filed Sep. 30, 2004, the entire specification claims and drawings of which are incorporated herewith by reference.

TECHNICAL FIELD

The present invention relates to an apparatus and method for controlling a plant, which is modeled with a plurality model parameters, by partially identifying the model parameters.

BACKGROUND OF THE INVENTION

A control apparatus typically controls a controlled object (also referred to as a plant) that is modeled by model parameters. According to a scheme disclosed in Japanese Patent Application Publication No. 2003-15703, an identifier is provided in such a control apparatus to determine a control input through use of model parameters recursively identified by the identifier. Such recursive identification can improve the capability for the control output to follow its desired value.

FIG. 20 shows a functional block diagram of a typical control apparatus. A controlled object 101 is modeled by model parameters. An identifier 102 identifies the model parameters based on a control input and a control output of the controlled object 101. A state predictor 103 considers a dead time, which the controlled object 101 has, to generate a predicted value of the control output by using the model parameters. The predicted value is compared with a desired value. A controller 105 determines the control input into the controlled object 101 so that the predicted value converges to the desired value.

SUMMARY OF THE INVENTION

A controlled object is typically modeled using a plurality of model parameters. Depending on the object, some of the model parameters do not largely change because these parameters are little influenced by variation in the behavior of the object and deterioration over time. Including such model parameters, a conventional method identifies all the model parameters by the identifier.

As the number of model parameters to be identified increases, the time required for causing the model parameters to converge to optimal values is longer. If the convergence time is long, a delay may occur in adapting to a change of the dynamic behavior of the controlled object. If the number of model parameters is large, the computational complexity of the identifier may increase. In some controlled objects, the identifier cannot be introduced unless the number of times that the identification algorithm is performed is reduced.

Therefore, there is a need for a control apparatus comprising an identifier that can partially identify a plurality of model parameters.

According to one aspect of the invention, a control apparatus for controlling an object that is modeled using at least one first model parameter and at least one second model parameter comprises a partial model parameter identifier and a controller. The partial model parameter identifier recursively identifies the second parameter based on an output from the object and an input into the object. The controller uses the first model parameter that is pre-identified and the second model parameter that is identified by the partial model parameter identifier to determine the input into the object so that the output from the object converges to a desired value.

According to the invention, when an object modeled using a plurality of model parameters is controlled, only some of the model parameters are recursively identified. Since the number of model parameters to be identified can be reduced, the time required for causing the model parameters to converge to optimal values can be shortened and hence computation complexity of the identification can be reduced.

According to one embodiment of the invention, the partial model parameter identifier uses the second model parameter to model a virtual plant. The virtual plant includes the object and at least one component that is based on the first model parameter. The partial model parameter identifier identifies the second model parameter so that an output from the virtual plant converges to an output of the model of the virtual plant. Such a virtual plant allows only the second parameter to be recursively identified so as to control the controlled object.

According to another embodiment of the invention, the partial model parameter identifier determines the second model parameter by adding an updating element of the second model parameter to a reference value of the second model parameter. The partial model parameter identifier determines the updating element so that the output of the virtual plant converges to the output of the model of the virtual plant. Such an identification scheme can improve the speed of adapting to a model for a controlled object having large dynamic characteristics, thereby improving the control accuracy when the controlled object is in a transit state.

According to one embodiment of the invention, a correction amount is determined based on a difference between the output of the virtual plant and the output of the model of the virtual plant. The correction amount is added to a value obtained by multiplying a past value of the updating element of the second model parameter by a forgetting coefficient to determine the updating element. The forgetting coefficient is less than one. Since the forgetting coefficient less than one is multiplied, it is avoided that the control system becomes unstable due to a drift in the model parameters.

According to another embodiment of the invention, a correction amount is determined based on a difference between the output of the virtual plant and the output of the model of the virtual plant. For one of a plurality of the second model parameters, the updating element is determined by adding the correction amount to a value that is obtained by multiplying a past value of the updating element by a first forgetting coefficient. The first forgetting coefficient has a value of one. For the remaining of the plurality of the second model parameters, the updating element is determined by adding the correction amount to a value that is obtained by multiplying a past value of the updating element by a second forgetting coefficient. The second forgetting coefficient has a value less than one. Thus, a drift of the model parameters can be avoided and a steady state error between the output of the controlled object and a desired value can be suppressed.

According to one embodiment of the invention, the controller uses a response assignment control to determine the input into the object. Such a response assignment control can cause the output of the controlled object to rapidly converge to a desired value without overshooting. A 2-degree-freedom response assignment control can be used as the response assignment control. The 2-degree-freedom response assignment control can cause a difference from the desired value caused by disturbance to converge without vibration while causing the output of the controlled object to follow the desired value without causing a steady state error.

The above-described schemes of the invention are applicable in various embodiments. In one embodiment, the controlled object is a variable phase apparatus for variably controlling the phase of a camshaft. In another embodiment, the controlled object is an engine and the output of the engine is caused to converge to a desired value. In yet another embodiment, the controlled object is an exhaust system of an engine. The concentration of the exhaust gas obtained from the exhaust gas sensor provided in the exhaust gas passage is caused to converge to a desired value. In another embodiment, the controlled object is a mechanical element and an actuator for driving the mechanical element in a vehicle. An amount that the mechanical element is driven is caused to converge to a desired value. For example, an air device for adjusting the amount of air into the engine can be the controlled object.

In another embodiment, the invention provides a method for controlling an object in a manner as described above.

DESCRIPTION OF THE PREFERRED EMBODIMENTS

Structure of an Internal-Combustion Engine and a Control Unit

Figure 1:
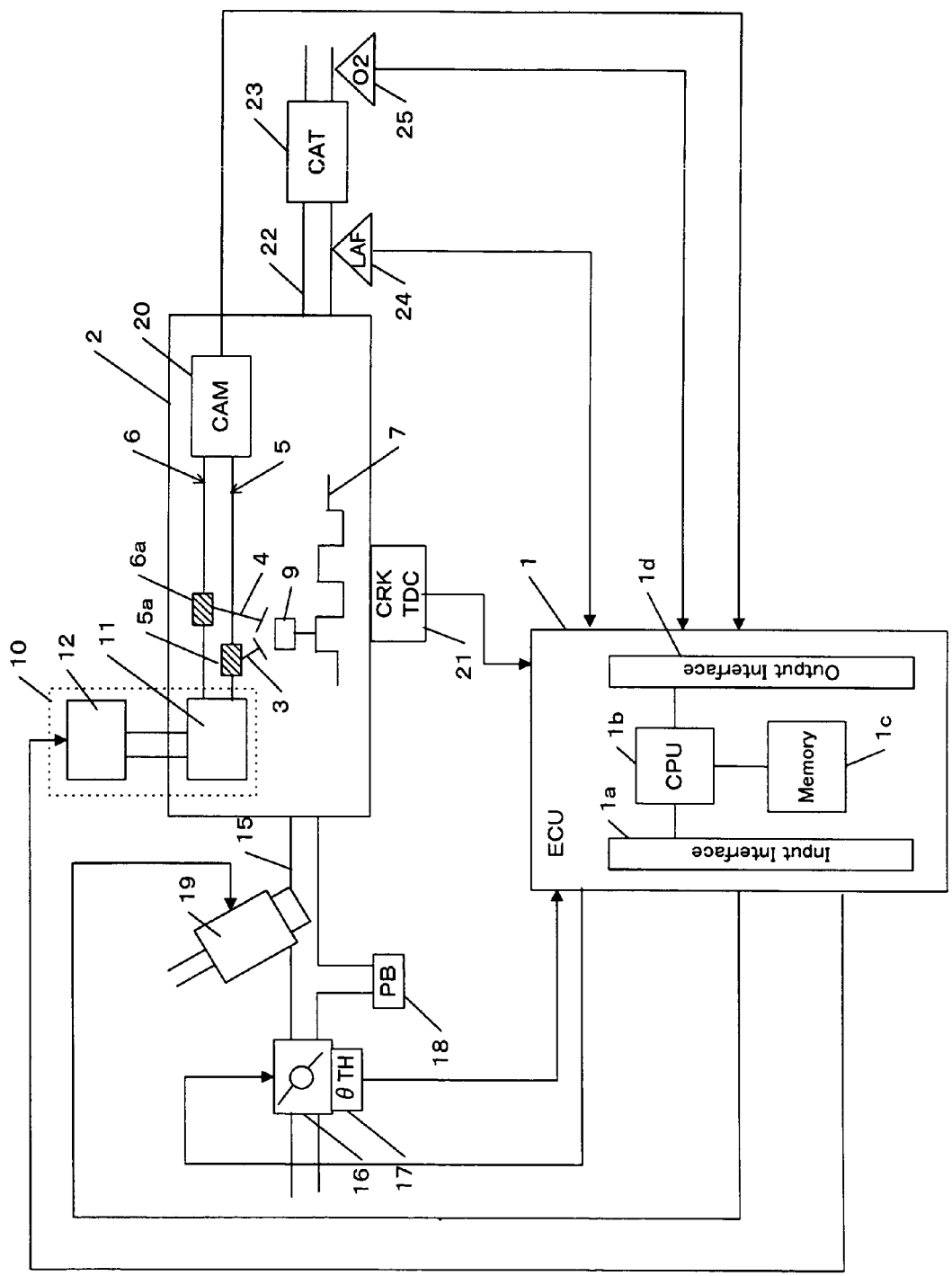
FIG. 1 is a schematic diagram of an engine and its control unit in accordance with one embodiment of the present invention.

Referring to the drawings, specific embodiments of the invention will be described. FIG. 1 shows an overall structure of an internal combustion engine (hereinafter referred to as an engine) and a control unit for the engine in accordance with one embodiment of the invention.

An electronic control unit (hereinafter referred to as an ECU) 1 comprises an input interface 1$a$ for receiving data sent from each part of the vehicle, a CPU 1$b$ for carrying out operations for controlling each part of the vehicle, a memory 1$c$ including a read only memory (ROM) and a random access memory (RAM), and an output interface 1$d$ for sending control signals to each part of the vehicle. One or more programs and various data for controlling each part of the vehicle are stored in the ROM. One or more programs and data for implementing a control in accordance with the invention are also stored in the ROM. The ROM may be a rewritable ROM such as an EPROM. The RAM provides work areas for operations by the CPU 1$b$, in which data sent from each part of the vehicle as well as control signals to be sent out to each part of the vehicle are temporarily stored.

An engine 2 is, for example, a 4-cycle, DOHC gasoline engine. The engine 2 comprises an intake camshaft 5 and an exhaust camshaft 6. The intake camshaft 5 has an intake cam 5$a$ for driving an intake valve 3 to open and close. The exhaust camshaft 6 has an exhaust cam 6$a$ for driving an exhaust valve 4 to open and close. These intake and exhaust camshafts 5 and 6 are connected to a crankshaft 7 via a timing belt (not shown). These camshafts rotate once for every two rotations of the crankshaft 7.

A continuously-variable-phase device (hereinafter referred to as a "phase device") 10 has a continuously-variable-phase mechanism (hereinafter referred to as a "phase mechanism") 11 and a hydraulic driving unit 12. The hydraulic driving unit 12 drives the phase mechanism 11 with a hydraulic pressure in accordance with a command value supplied by the ECU 1. In doing so, an actual phase CAIN of the intake cam 5$a$ can continuously advance or retard with respect to the crankshaft 7. The phase device 10 will be described in detail later referring to FIG. 2.

A cam angle sensor 20 is disposed at an end portion of the intake camshaft 5. As the intake camshaft 5 rotates, the cam angle sensor 20 outputs to the ECU 1 a CAM signal, which is a pulse signal, at every predetermined cam angle (for example, every one degree).

A throttle valve 16 is disposed in an intake manifold 15 of the engine 2. An opening degree of the throttle valve 16 is controlled by a control signal from the ECU 1. A throttle valve opening sensor (θTH) 17, which is connected to the throttle valve 16, supplies the ECU 1 with an electric signal corresponding to the opening angle of the throttle valve 16.

An intake manifold pressure (Pb) sensor 18 is disposed downstream of the throttle valve 16. The intake manifold pressure Pb detected by the Pb sensor 18 is sent to the ECU 1.

A fuel injection valve 19 is provided, for each cylinder, in the intake manifold 15. The fuel injection valve 19 is supplied with fuel from a fuel tank (not shown) to inject the fuel in accordance with a control signal from the ECU 1.

A crank angle sensor 21 is disposed in the engine 2. The crank angle sensor 21 outputs a CRK signal and a TDC signal, which are pulse signals, to the ECU 1 in accordance with the rotation of the crankshaft 7.

The CRK signal is a pulse signal that is output at every predetermined crank angle (for example, 30 degrees). The ECU 1 calculates a rotational speed NE of the engine 2 in accordance with the CRK signal. The ECU 1 also calculates a phase CAIN based on the CRK signal and the CAM signal. The TDC signal is also a pulse signal that is output at a crank angle associated with a TDC position of a piston 9.

An exhaust manifold 22 is connected on the downstream side of the engine 2. The engine 2 emits exhaust gas through the exhaust manifold 22. A catalytic converter 23, which is disposed in the exhaust manifold 22, purifies undesirable elements such as HC, CO, NOx contained in the exhaust gas.

A wide-range air/fuel ratio (LAF) sensor 24 is disposed upstream of the catalytic converter 23. The LAF sensor 24 detects an air/fuel ratio over a wide range extending from rich to lean. The detected air/fuel ratio is sent to the ECU 1.

An O2 (exhaust gas) sensor 25 is disposed downstream of the catalyst converter. The O2 sensor 25 is a binary-type of exhaust gas concentration sensor. The O2 sensor outputs a high level signal when the air-fuel ratio is richer than the stoichiometric air-fuel ratio, and outputs a low level signal when the air-fuel ratio is leaner than the stoichiometric air-fuel ratio. The electric signal is sent to the ECU 1.

Signals sent to the ECU 1 are passed to the input interface 1a. The input interface 5a converts analog signal values into digital signal values. The CPU 1b processes the resulting digital signals, performs operations in accordance with programs stored in the memory 1c, and creates control signals. The output interface 1d sends these control signals to actuators for the throttle valve 16, hydraulic driving unit 12, fuel injection valve 19 and other mechanical components.

Continuously-Variable-Phase Device

One embodiment in accordance with the present invention will be described. In the embodiment, the controlled object is a phase device. However, a control scheme in accordance with the present invention can be applied to other various controlled objects.

Figure 2:
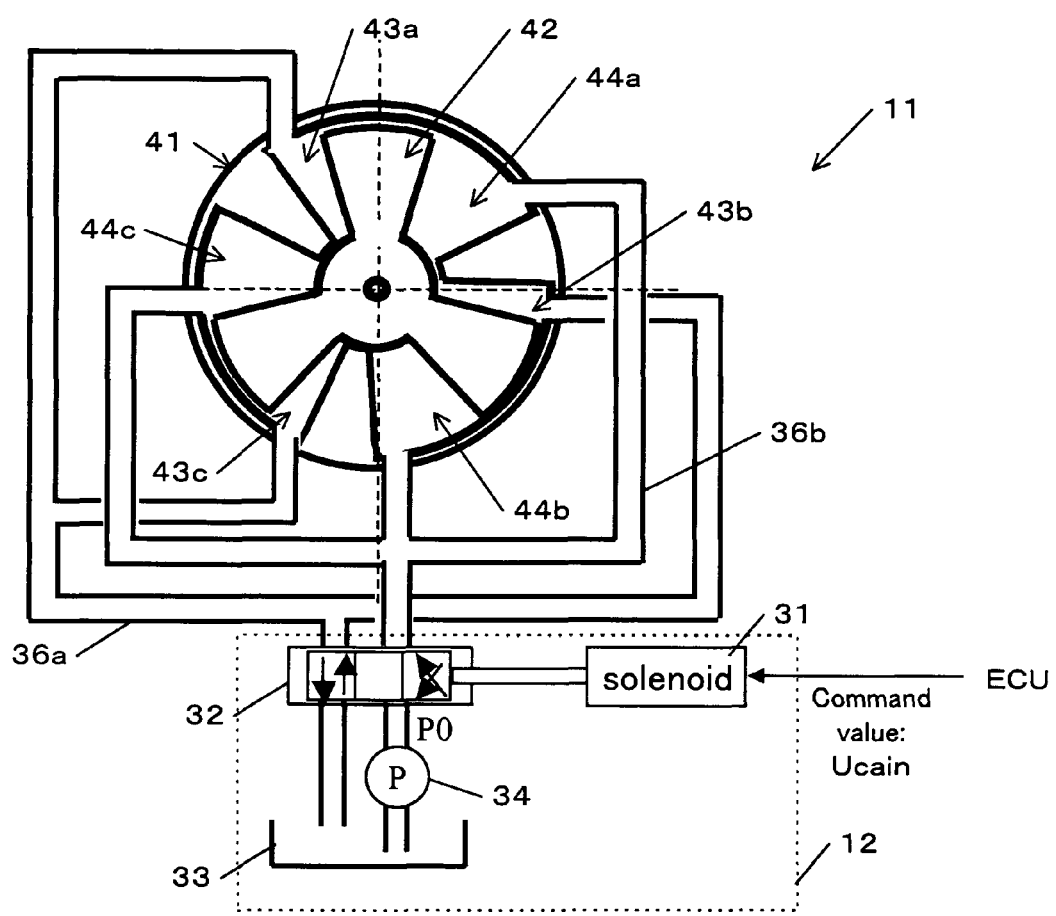
FIG. 2 is a block diagram of a continuously-variable-phase mechanism in accordance with one embodiment of the present invention.

FIG. 2 shows an example of the phase device 10 shown in FIG. 1. The phase device 10 has the phase mechanism 11 and the hydraulic driving unit 12 as described above.

A command value Ucain is supplied from the ECU 1 to a solenoid 31. The solenoid 31 is energized in accordance with the command value Ucain, and then a hydraulic spool valve 32 is driven by the solenoid 31. The hydraulic spool valve 32 controls the flow of hydraulic fluid from a tank 33 through a pump 34 to the phase mechanism 11.

The hydraulic spool valve 32 is connected to the phase mechanism 11 through an advance oil passage 36a and a retard oil passage 36b. A hydraulic pressure OP1 of the hydraulic fluid to be supplied to the advance oil passage 36a and a hydraulic pressure OP2 of the hydraulic fluid to be supplied to the retard oil passage 36b are controlled through the hydraulic spool valve 32 in accordance with the command value Ucain.

The phase mechanism 11 comprises a housing 41 and a vane 42. The housing 41 is connected to the crankshaft 7 through a sprocket and a timing belt (both not shown). The housing 41 rotates in the same direction as the rotation of the crankshaft 7.

The vane 42 extends radially from the intake camshaft 5 that is inserted into the housing 41. The vane 42 is accommodated in the housing 41 in such a manner that it can rotate relative to the housing 41 within a predetermined range. The fan-shaped space formed in the housing 41 is partitioned into three advance chambers 43a, 43b and 43c and three retard chambers 44a, 44b and 44c by the vane 42. The advance passage 36a is connected to the three advance chambers 43a to 43c. The hydraulic fluid of the hydraulic pressure OP1 is supplied to the advance chambers 43a to 43c through the advance passage 36a. The retard passage 36b is connected to three retard chambers 44a to 44c. The hydraulic fluid of the hydraulic pressure OP2 is supplied to the retard chambers 44a to 44c through the retard passage 36b.

When a difference between the hydraulic pressure OP1 and the hydraulic pressure OP2 is zero, the vane 42 does not rotate relative to the housing 41, so that the value of the phase CAIN is maintained. When the hydraulic pressure OP1 becomes larger than the hydraulic pressure OP2 in accordance with the command value Ucain from the ECU 1, the vane 42 rotates in the advance direction relative to the housing 41, so that the phase CAIN advances. When the hydraulic pressure OP2 becomes larger than the hydraulic pressure OP1 in accordance with the command value Ucain from the ECU 1, the vane 42 rotates in the retard direction relative to the housing 41, so that the phase CAIN retards.

In such a phase device, variations may occur in the hydraulic fluid out of the pump. The viscosity of the hydraulic fluid may change. The space between the vane and the housing may change with time. These conditions may change the dynamic behavior of the phase device. It is preferable to control the phase CAIN so that the phase CAIN converges to a desired value robustly against such changes of the dynamic behavior of the phase device.

A Control Apparatus in Accordance with a First Embodiment

Figure 3:
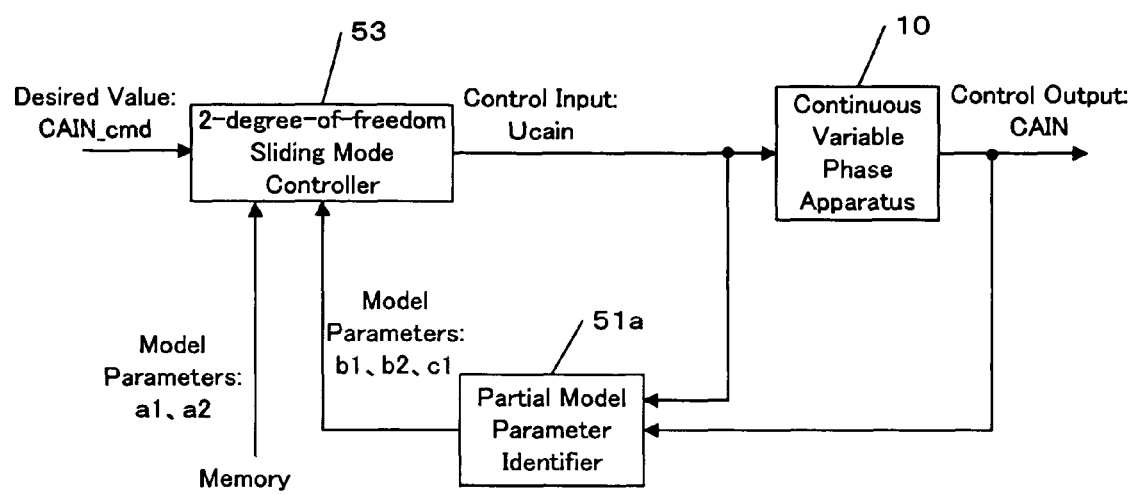
FIG. 3 shows a block diagram of a control apparatus in accordance with a first embodiment of the present invention.

FIG. 3 shows a block diagram of an apparatus for controlling the phase device 10 in accordance with a first embodiment of the present invention.

As described above, the control input Ucain into the phase device 10, which is a controlled object, is a command value for driving the solenoid 31. The control output CAIN is an actual phase of the intake cam 5a relative to the crankshaft 7. The equation (1) shows a model expression of the phase device 10.

$$\text{CAIN}(k+1) = a1 \cdot \text{CAIN}(k) + a2 \cdot \text{CAIN}(k-1) + b1 \cdot U\text{cain}(k) + b2 \cdot U\text{cain}(k-1) \tag{1}$$

A disturbance may be applied to the phase device 10. Assuming that such disturbance is represented by c1, the model expression of the equation (1) is expressed by the equation (2). "c1" may be referred to as an estimated disturbance value.

$$\text{CAIN}(k+1) = a1 \cdot \text{CAIN}(k) + a2 \cdot \text{CAIN}(k-1) + b1 \cdot U\text{cain}(k) + b2 \cdot U\text{cain}(k-1) + c1 \tag{2}$$

The influence by the behavior of the phase device 10 on the model parameters b1, b2 and c1 is larger than the influence on the model parameters a1 and a2. Therefore, the model parameters b1, b2 and c1 are recursively identified by a partial model parameter identifier 5a so that a modeling error is eliminated. The model parameters a1 and a2 are pre-identified and stored in the memory 1c (FIG. 1).

Thus, since the number of the model parameters to be recursively identified by the identifier is reduced, the time required for causing the model parameters to converge to optimal values can be shortened. The complexity of the identification can be reduced.

The partial model parameter identifier 51a is connected to a 2-degree-of-freedom sliding mode controller 53. The sliding mode controller 53 uses the model parameters b1, b2 and c1 received from the partial model parameter identifier 51a and a1 and a2 retrieved from the memory 1c to calculate the control input Ucain so that the control output CAIN converges to a desired value CAIN_cmd (more specifically, so that the control output CAIN converges to CAIN_cmd_f that is derived from the desired value CAIN_cmd, which will be described later). The control input Ucain is applied to the phase device 10.

Partial Model Parameter Identifier

A scheme of performing a partial identification, which is implemented by a partial model parameter identifier 51a, in accordance with the first embodiment shown in FIG. 3 will be described. In order to partially identify the model parameters, a virtual plant is first constructed. A method for constructing the virtual plant will be described.

The equation (2) is shifted by one step to the past (equation (3)). The model parameters b1(k), b2(k) and c1(k) that are to be identified in the current cycle are substituted into the shifted equation (equation (4)). The model parameters that are to be identified are collected in the right-hand side of the equation (equation (5)).

$$CAIN(k+1) = a1 \cdot CAIN(k) + a2 \cdot CAIN(k-1) + b1 \cdot Ucain(k) + b2 \cdot Ucain(k) + c1 \quad (2)$$

⇓

$$CAIN(k) = a1 \cdot CAIN(k-1) + a2 \cdot CAIN(k-2) + b1 \cdot Ucain(k-1) + b2 \cdot Ucain(k-2) + c1 \quad (3)$$

⇓

$$CAIN(k) = a1 \cdot CAIN(k-1) + a2 \cdot CAIN(k-2) + b1(k) \cdot Ucain(k-1) + b2(k) \cdot Ucain(k-2) + c1(k) \quad (4)$$

⇓

$$CAIN(k) - a1 \cdot CAIN(k-1) - a2 \cdot CAIN(k-2) = b1(k) \cdot Ucain(k-1) + b2(k) \cdot Ucain(k-2) + c1(k) \quad (5)$$

The left-hand side of the equation (5) is represented by $W(k)$ and the right-hand side by $W_{13}$ hat(k).

$$W(k) = CAIN(k) - a1 \cdot CAIN(k-1) - a2 \cdot CAIN(k-2) \quad (6)$$

$$W\_hat(k) = b1(k) \cdot Ucain(k-1) + b2(k) \cdot Ucain(k-2) + c1(k) \quad (7)$$

Figure 4:
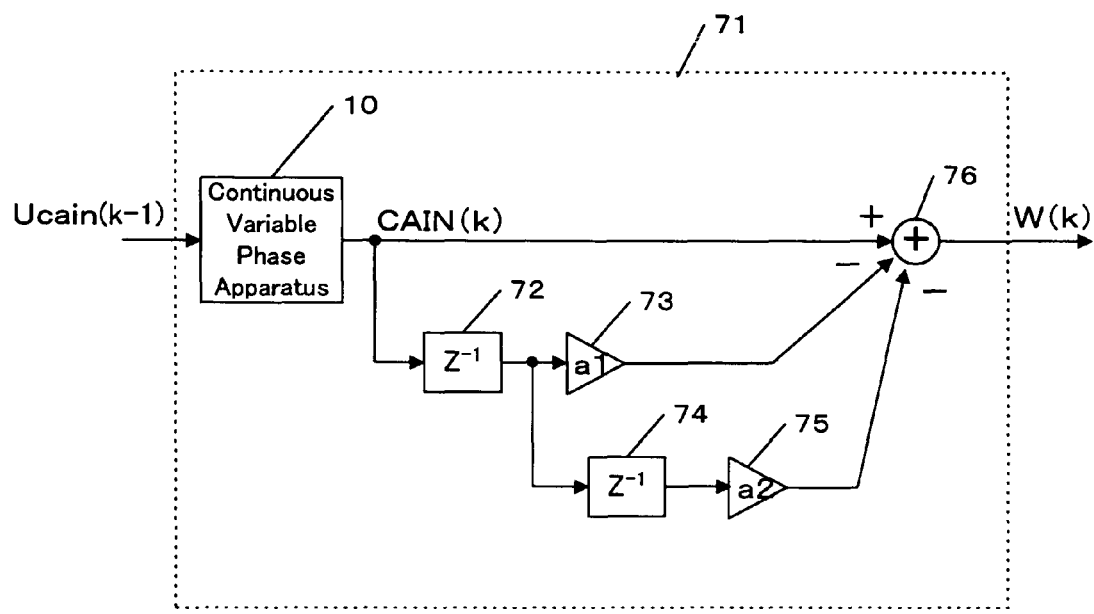
FIG. 4 shows a structure of a virtual plant for an identification algorithm in accordance with one embodiment of the present invention.

W(k) shown in the equation (6) can be regarded as an output of the virtual plant 71 as shown in FIG. 4. The output of the virtual plant 71 is obtained by subtracting from the actual control output CAIN both of a value that is calculated by multiplying the model parameter a1 by CAIN(k−1) which is obtained by delaying the control output CAIN by a delay element 72, and a value that is calculated by multiplying the model parameter a2 by a delayed value CAIN(k−2) which is obtained by delaying CAIN(k−1) by a delay element 74. The equation (7) can be regarded as a model expression of the virtual plant 71. If there is no modeling error, the output W(k) of the virtual plant 71 matches the output W_hat(k) of the model of the virtual plant 71.

The partial model parameter identifier 51a identifies the model parameters b1, b2 and c1 that appear in the model expression (7) of the virtual plant 71 by using a recursive identification algorithm.

The recursive identification algorithm is expressed as shown in the equation (8). A model parameter vector θ(k) is calculated in accordance with this algorithm.

$$\theta(k) = \theta(k-1) + KP(k) \cdot E\_id(k) \quad (8)$$

where $$\theta^T(k) = [b1(k), b2(k), c1(k)] \quad (9)$$

The model parameter vector θ(k) is calculated so that a modeling error E_id(k) expressed by the equation (10) is eliminated, that is, the output W(k) of the virtual plant 71 converges to the output W_(k) of the model of the virtual plant 71.

$$E\_id(k) = W(k) - W\_hat(k) \quad (10)$$

where $$W(k) = CAIN(k) - a1 \cdot CAIN(k-1) - a2 \cdot CAIN(k-2)$$

$$W\_hat(k) = \theta^T(k) \cdot \zeta(k)$$
$$= b1(k) \cdot Ucain(k-1) + b2(k) \cdot Icain(k-2) + c1(k)$$

$$\zeta^T(k) = [Ucain(k-1), Ucain(k-2), 1]$$

KP(k) indicates a gain coefficient vector, which is defined by the equation (11). P(k) in the equation (11) is calculated in accordance with the equation (12).

$$KP(k) = \frac{P(k-1) \cdot \zeta(k)}{1 + \zeta^T(k) \cdot P(k-1) \cdot \zeta(k)} \quad (11)$$

$$P(k) = \frac{1}{\lambda 1}\left(I - \frac{\lambda 2 \cdot P(k-1) \cdot \zeta(k) \cdot \zeta^T(k)}{\lambda 1 + \lambda 2 \cdot \zeta^T(k) \cdot P(k-1) \cdot \zeta(k)}\right) P(k-1) \quad (12)$$

*wherer I is a unit matrix of (3×3).*

Depending on the values of λ1 and λ2, the type of the identification algorithm in accordance with the equations (8) to (12) is determined as follows:

λ1=1 and λ2=0: fixed gain algorithm
λ1=1 and λ2=1: least squares algorithm
λ1=1 and λ2=λ: decreasing gain algorithm (λ is a predetermined value other than 0 and 1)
λ1=λ and λ2=1: weighted least squares algorithm (λ is a predetermined value other than 0 and 1).

Alternatively, the model parameters a1 and a2, which are pre-identified based on one or more predetermined parameters, may be defined in a map. Such a map may be stored in the memory 1c (FIG. 1). The predetermined parameters may be representative of engine operating condition such as an engine rotational speed NE. A model parameter scheduler may be provided in a control apparatus. The model parameter scheduler can refer to the map based on a detected engine rotational speed NE to determine the model parameters a1 and a2.

A Control Apparatus in Accordance with a Second Embodiment

Figure 5:
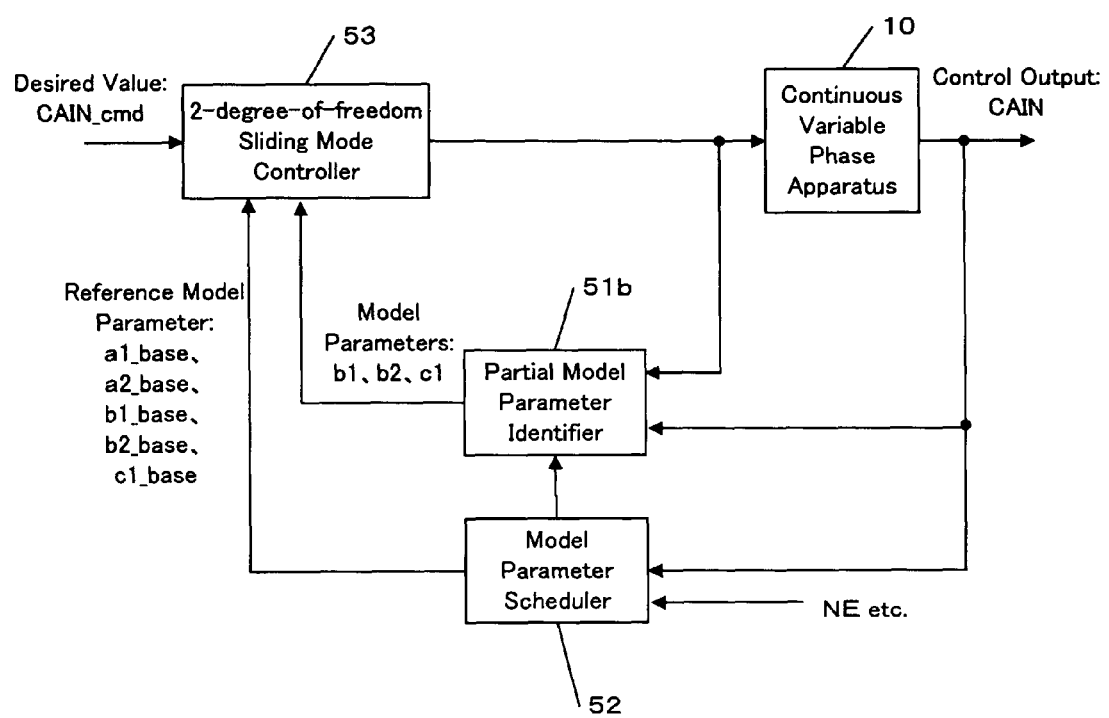
FIG. 5 shows a block diagram of a control apparatus in accordance with a second embodiment of the present invention.

FIG. 5 shows a block diagram of a control apparatus for controlling the phase device 10 in accordance with a second embodiment of the invention. The second embodiment differs from the first embodiment in the partial identification performed by the partial model parameter identifier 51b. The second embodiment further differs from the first embodiment in that a model parameter scheduler 52 is additionally provided.

Figure 6:
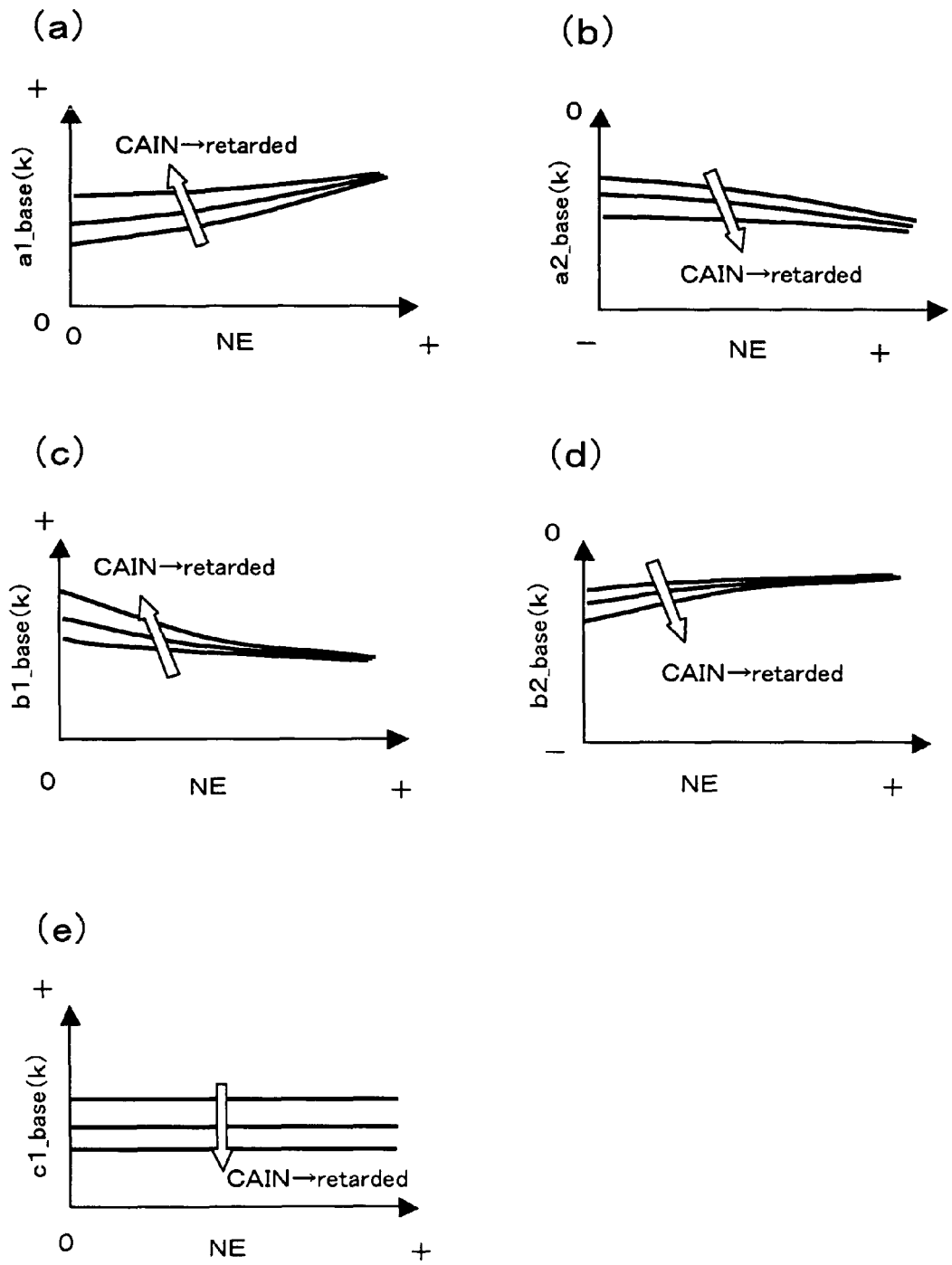
FIG. 6 shows maps defining reference model parameters that are accessed by a parameter scheduler in accordance with a second embodiment of the present invention.

The model parameter scheduler 52 refers to maps based on the control output CAIN and the engine rotational speed NE to retrieve reference model parameters a1_base, a2_base, b1_base, b2_base and c1_base. An example of such maps is shown in FIGS. 6 (a)-(e). The reference model parameters are pre-identified in accordance with the dynamic characteristics of the phase device and specified in the maps. The maps may be stored in the memory 1c (FIG. 1). Alternatively, the model parameter scheduler 52 may hold the maps. The reference model parameters retrieved from the maps are passed to the partial model parameter identifier 51b.

The partial model parameter identifier 51b uses a so-called "δ (delta) correction method" to identify the model parameters b1, b2 and c1. The delta correction method is described in detail in Japanese Patent No. 3304845 assigned to the assignee of the present application. The delta correction method will be here described in brief.

A recursive identification algorithm according to the delta correction method is shown by the equation (13). A model parameter vector θ(k) is represented by a sum of a reference value θ_base(k) and an updating element dθ(k). δ indicates a forgetting vector as shown in the equation (18).

$$\theta(k) = \theta\_base(k) + d\theta(k) \quad (13)$$

$$d\theta(k) = \delta \cdot d\theta(k-1) + KP(k) \cdot E\_id(k) \quad (14)$$

$$\text{where } \theta^T(k) = [b1(k), b2(k), c1(k)] \quad (15)$$

$$d\theta^T(k) = [db1(k), db2(k), dc1(k)] \quad (16)$$

$$\theta\_base^T(k) = [b1\_base(k), b2\_base(k), c1\_base(k)] \quad (17)$$

$$\delta = \begin{bmatrix} \delta_1 & 0 & 0 \\ 0 & \delta_2 & 0 \\ 0 & 0 & \delta_3 \end{bmatrix} \quad (18)$$

In one embodiment, the value of each element $\delta_1$, $\delta_2$ and $\delta_3$ of the forgetting vector δ is set to be greater than zero and less than one. Such setting of the forgetting vector prevents occurrence of a drift of the model parameters.

In another embodiment, one of the elements $\delta_1$, $\delta_2$ and $\delta_3$ of the forgetting vector δ set to a value of one. The other elements are set to a value greater than zero and less than one. Such setting of the forgetting vector reduces a steady state error with respect to a desired value while preventing occurrence of a drift of the model parameters.

According to δ correction method, the updating element dθ(k) is determined so that the identification error E_id(k) shown in the equation (14) is eliminated. The identification error E_id(k) is shown by the equation (19), as is the first embodiment.

$$E\_id(k) = W(k) - W\_hat(k) \quad (19)$$

where $$W(k) = CAIN(k) - a1 \cdot CAIN(k-1) - a2 \cdot CAIN(k-2)$$

$$\begin{aligned} W\_hat(k) &= \theta^T(k) \cdot \zeta(k) \\ &= b1(k) \cdot Ucain(k-1) + b2(k) \cdot Ucain(k-2) + c1(k) \end{aligned}$$

$$\zeta^T(k) = [Ucain(k-1), Ucain(k-2), 1]$$

A gain KP(k) is shown by the equation (20), as is the first embodiment.

$$KP(k) = \frac{P'(k-1) \cdot \zeta(k)}{1 + \zeta^T(k) \cdot P'(k-1) \cdot \zeta(k)} \quad (20)$$

$$P'(k) = \frac{1}{\lambda 1}\left(I - \frac{\lambda 2 \cdot P'(k-1) \cdot \zeta(k) \cdot \zeta^T(k)}{\lambda 1 + \lambda 2 \cdot \zeta^T(k) \cdot P'(k-1) \cdot \zeta(k)}\right)P'(k-1) \quad (21)$$

where $I$ is a unit matric of (3×)

In the identification algorithm according to the first embodiment, the model parameter vector θ(k) is determined by adding the vector θ(k−1) determined in the previous cycle and a value obtained by multiplying a predetermined gain by the identification error E_id(k), as shown in the equation (8). Therefore, the identification error E_id may be accumulated in the vector θ. If an adaptive control based on model parameters determined by such an identification algorithm is performed when a steady state of the controlled object continues, the model parameter vector θ may drift.

According to δ correction method, the model parameter vector θ(k) is determined by addition of the reference value θ_base(k) and the updating element dθ(k) as shown in the equation (13). The past value of the updating element is multiplied by the forgetting coefficient that has a value greater than zero and less than one. When the steady state of the controlled object continues, the addition of the reference value and the updating element may be repeated. However, such repetition only leads to returning the model parameter vector θ to the reference value θ_base. Therefore, a drift of the model parameters can be prevented.

2-Degree-of-Freedom Sliding Mode Controller

Figure 7:
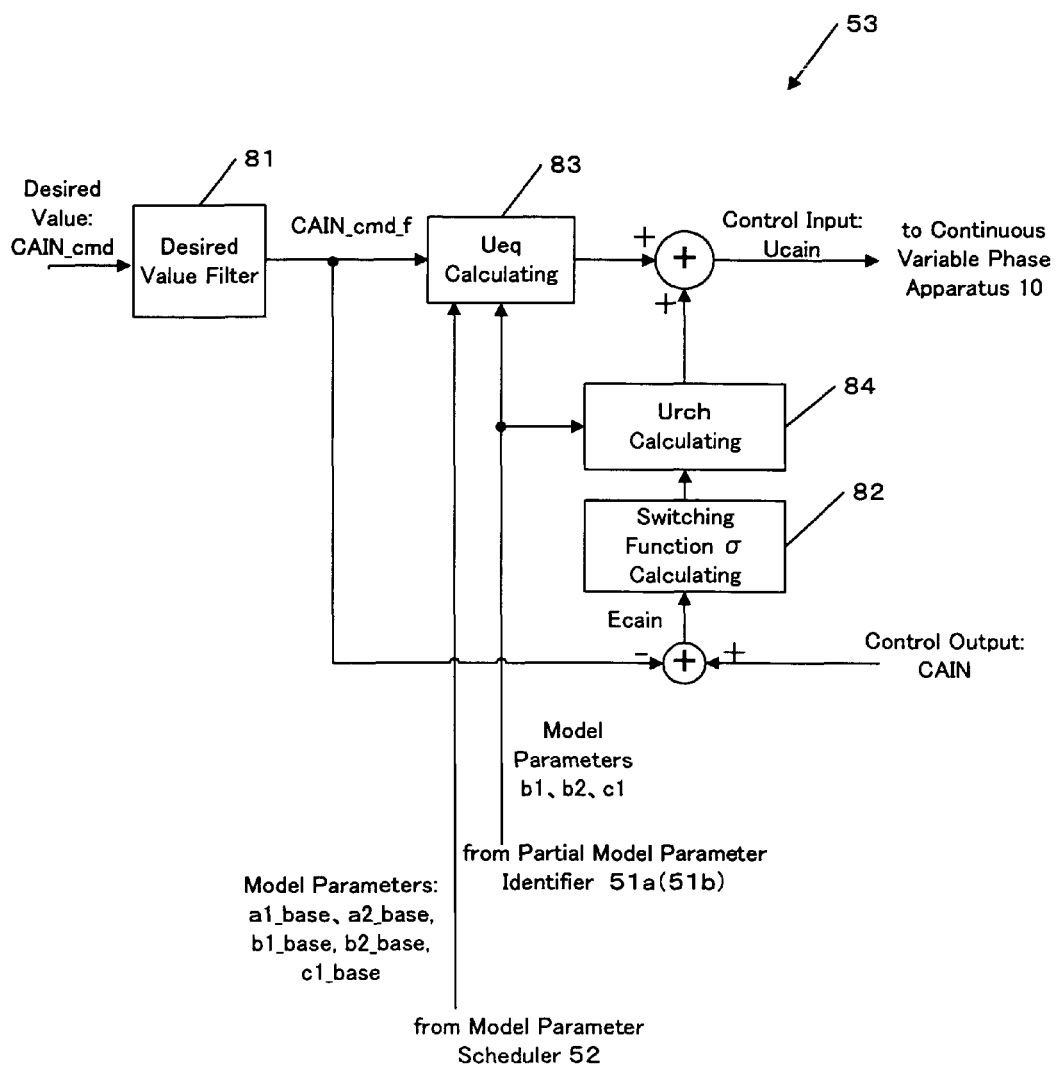
FIG. 7 is a block diagram showing a 2-degree-of-freedom controller in accordance with one embodiment of the present invention.

FIG. 7 shows a block diagram of the 2-degree-of-freedom sliding mode controller 53. The sliding mode controller 53 calculates the control input Ucain using a 2-degree-of-freedom sliding mode control. A sliding mode control is a response assignment control that is capable of specifying a convergence speed of a controlled variable. The 2-degree-of-freedom sliding mode control is an extended version of the sliding mode control. According to the 2-degree-of-freedom sliding mode control, a speed that a controlled variable follows a desired value and a speed that the controlled variable converges when disturbance is applied can be separately specified.

A desired value filter 81 uses a desired value response assignment parameter POLE_f to apply a first-order delay filter (a low-pass filter) to the desired value CAIN_cmd. The desired value response assignment parameter POLE_f defines the speed that the controlled variable follows the desired value. It is set to satisfy −1<POLE_f<0.

$$CAIN\_cmd\_f(k) = -POLE\_f \cdot CAIN\_cmd\_f(k-1) + (1+POLE\_f) \cdot CAIN\_cmd(k) \quad (22)$$

As shown in the equation (22), the trajectory of the desired value CAIN_cmd_f is specified by the desired value response assignment parameter POLE_f. The speed that the controlled variable follows the desired value can be specified in accordance with what trajectory is set for the desired value.

A switching function determining part 82 defines a switching function σ as shown in the equation (23). Ecain is an error between the actual phase CAIN and the desired value CAIN_cmd_f. The switching function σ specifies a convergence behavior of the error. POLE is a response assignment parameter for suppressing disturbance. The converging speed of the error Ecain when disturbance is applied is determined by the response assignment parameter POLE. The response assignment parameter POLE is set to satisfy $-1<\text{POLE}<0$.

$$\sigma(k)=E\text{cain}(k)+\text{POLE}\cdot E\text{cain}(k-1) \quad (23)$$

where $$E\text{cain}(k)=\text{CAIN}(k)-\text{CAIN\_cmd\_}f(k-1)$$

Here, the switching function σ and response assignment parameter POLE will be described. As shown in the equation (24), according to the 2-degree-of-freedom sliding mode control, the control input is determined so that the switching function σ becomes zero.

$$\sigma(k)=0$$
⇓
$$E\text{cain}(k)=-\text{POLE}\cdot E\text{cain}(k-1) \quad (24)$$

The equation (24) represents a first-order delay system having no input. In other words, the 2-degree-of-freedom sliding mode control controls the error Ecain so that the error Ecain is confined within the first-order delay system shown in the equation (24).

Figure 8:
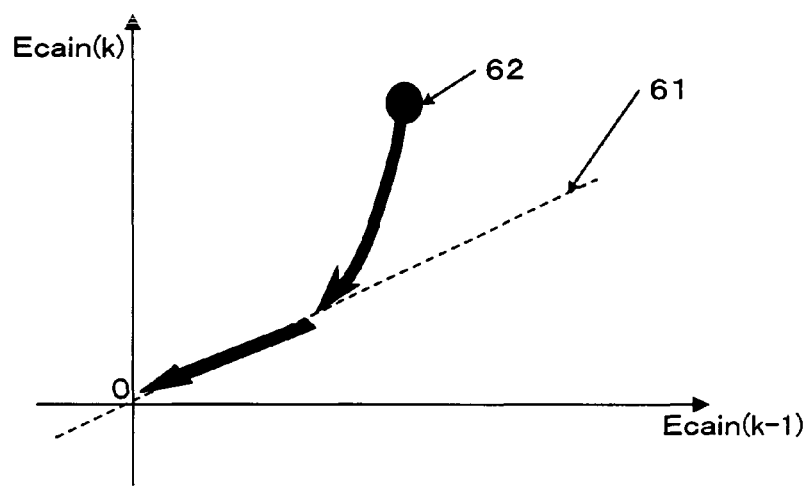
FIG. 8 shows a switching function of a sliding mode control in accordance with one embodiment of the present invention.

FIG. 8 shows a phase plane with Ecain(k) on the vertical axis and Ecain(k−1) on the horizontal axis. A switching line 61 expressed by the equation (24) is shown in the phase plane. Assuming that a point 62 is an initial value of a state quantity (Ecain(k−1), Ecain(k)), the sliding mode control places the state quantity on the switching line 61 and then constrains it on the switching line 61. Thus, the state quantity automatically converges to the origin (that is, Ecain (k) and Ecain (k−1)=0) of the phase plane with time because the state quantity is confined within the first-order delay system having no input. By constraining the state quantity on the switching line 61, the state quantity can converge to the origin without being influenced by disturbance.

Figure 9:
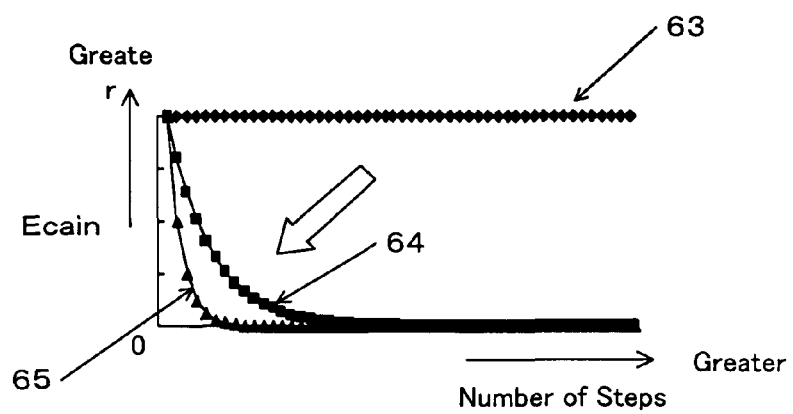
FIG. 9 shows a response assignment parameter of a sliding mode control in accordance with one embodiment of the present invention.

Reference numerals 63, 64 and 65 of FIG. 9 show the convergence speed when the response assignment parameter POLE for suppressing disturbance takes a value of −1, −0.8, and −0.5, respectively. As the absolute value of POLE becomes smaller, the convergence speed of the error Ecain becomes faster.

An equivalent control input determining part 83 calculates the equivalent control input Ueq. A method for calculating the equivalent control input Ueq will be described.

Since the equivalent control input Ueq acts to confine the state quantity on the switching line, the equivalent control input Ueq needs to satisfy the equation (25).

$$\sigma(k)=\sigma(k-1) \quad (25)$$

Based on the equation (25) and the above model expression (2), the equivalent control input Ueq is calculated as shown in the equation (26). It should be noted that, in the case according to the second embodiment shown in FIG. 5, a1_base and a2_base retrieved by the model parameter scheduler from maps (for example, maps shown in FIGS. 6(a) and 6(b)) are used instead of a1 and a2.

$$Ueq(k) = \frac{1}{b1(k)}$$
$$\{(1-\text{POLE}-a1(k))\cdot CAIN(k) + (\text{POLE}-a2(k))\cdot CAIN(k-1) - $$
$$b2(k)\cdot Ucain(k-1) + \text{CAIN\_cmd\_f}(k) + $$
$$(\text{POLE}-1)\cdot \text{CAIN\_cmd\_f}(k-1) - $$
$$\text{POLE}\cdot \text{CAIN\_cmd\_f}(k-2)\} \quad (26)$$

A reaching law input determining part 84 calculates the reaching law input Rrch in accordance with the equation (27). Urch is an input for placing the state quantity on the switching line. Krch indicates a feedback gain. The value of the feedback gain Krch is pre-identified through a simulation or the like taking into account the stability, quick responsiveness etc. of the controlled variable.

$$Urch(k) = \frac{-Krch}{b1(k)}\sigma(k) \quad (27)$$

As shown in the equation (28), the equivalent input control Ueq and input Ucain. The control input Ucain is to be applied to the phase device 10.

$$U\text{cain}(k)=U\text{eq}(k)+U\text{rch}(k) \quad (28)$$

Control Flow

Figure 10:
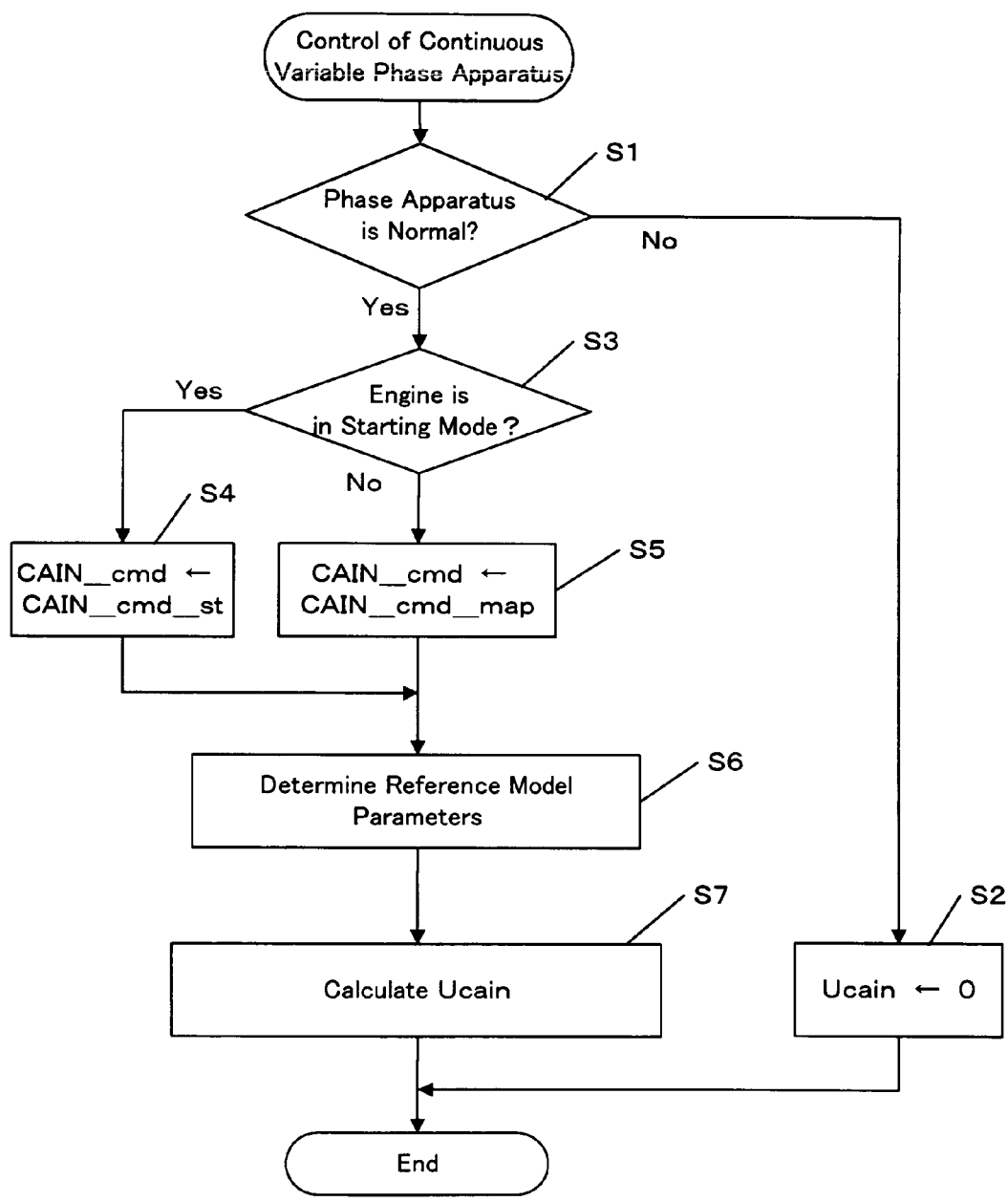
FIG. 10 shows a control flow in accordance with one embodiment of the present invention.

FIG. 10 is a flowchart of a control process in accordance with the second embodiment of the present invention. This process is carried out at a predetermined time interval.

In step S1, it is determined whether the phase device 10 is normal. An abnormality (such as a failure etc.) of the phase device can be detected by using any appropriate technique. If an abnormality is detected in the phase device, the control input Ucain is set to zero in step S2. In this embodiment, the phase device is configured so that the actual phase CAIN of the intake camshaft is most retarded when the control input Ucain is zero.

If it is determined in step S1 that the phase device 10 is normal, it is determined whether the engine is in the starting mode (S3). If the engine is in the starting mode, a predetermined value CAIN_cmd_st is set in the desired value CAIN_cmd in step S4. The predetermined value CAIN_cmd_st is set to be slightly advanced (for example, 10 degrees) so as to improve in-cylinder flow.

Figure 11:
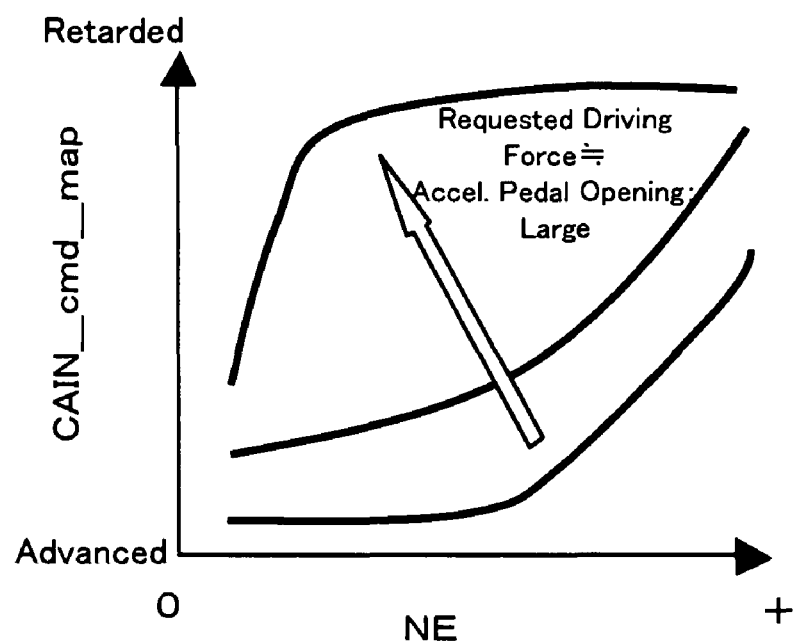
FIG. 11 shows a map used for determining a desired value of a phase of a camshaft in accordance with one embodiment of the present invention.

If the engine is not in the starting mode, a map is referred to based on the engine rotational speed NE to determine the desired value CAIN_cmd in step S5. An example of the map is shown in FIG. 11. As the rotational speed NE is higher, the desired value CAIN_cmd is set to be more retarded. Furthermore, as the requested driving force (which is typically represented by the opening angle of the accelerator pedal) increases, the desired value CAIN_cmd is set to be more retarded. In this embodiment, when the engine load is low, the driving force of the engine is decreased by causing the combustion of gas remaining in the cylinder. Therefore, when the engine load is low, the phase CAIN is set to be advanced. As the phase is set to be more advanced, the overlapping time during which both of the exhaust and intake valves are open is longer, increasing the remaining gas used for the combustion.

Figure 12:
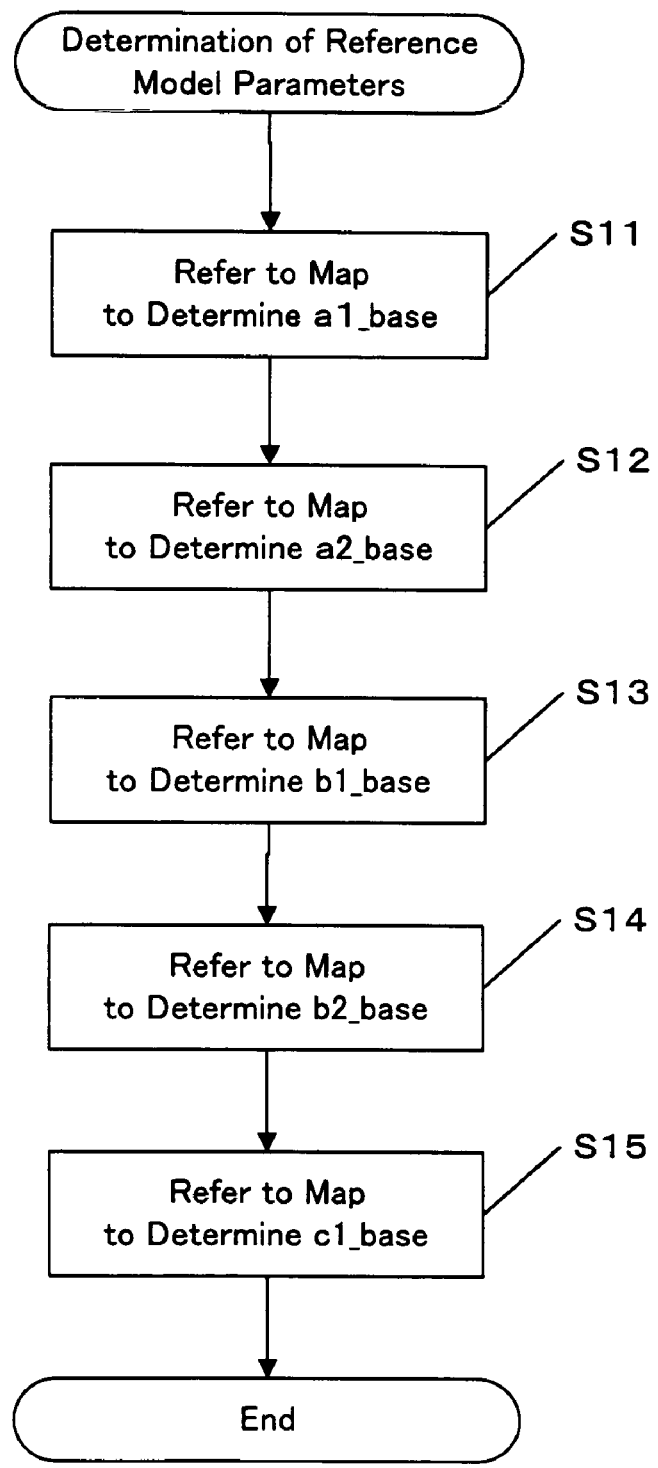
FIG. 12 shows a flow for determining model parameters by a model parameter scheduler in accordance with one embodiment of the present invention.

In step S6, the model parameter scheduler 52 performs a subroutine shown in FIG. 12 to determine the reference model parameters a1_base, a2_base, b1_base, b2_base and c1_base. In step S7, the partial model parameter identifier 51b and the sliding mode controller 53 perform the above-described operations to determine the control input Ucain.

FIG. 12 shows a process for determining the reference model parameters, which is performed by the model parameter scheduler 52. In step S11, a map as shown in FIG. 6(a) is referred to based on the phase CAIN and the engine rotational speed NE to determine the model parameter a1_base. The map is established so that as the engine rotational speed NE increases, the model parameter a_base 1 increases, and as the phase CAIN is more retarded, the model parameter a1_base increases.

In step S12, a map as shown in FIG. 6(b) is referred to based on the phase CAIN and the engine rotational speed NE to determine the model parameter a2_base. The map is established so that as the engine rotational speed NE increases, the model parameter a2_base decreases, and as the phase CAIN is more retarded, the model parameter a2_base decreases.

In step S13, a map as shown in FIG. 6(c) is referred to based on the phase CAIN and the engine rotational speed NE to determine the model parameter b1_base. The map is established so that as the engine rotational speed NE increases, the model parameter b1_base decreases, and as the phase CAIN is more retarded, the model parameter b1_base increases.

In step S14, a map as shown in FIG. 6(d) is referred to based on the phase CAIN and the engine rotational speed NE to determine the model parameter b2_base. The map is established so that as the engine rotational speed NE increases, the model parameter b2_base increases, and as the phase CAIN is more retarded, the model parameter b2_base decreases.

In step S15, a map as shown in FIG. 6(e) is referred to based on the phase CAIN and the engine rotational speed NE to determine the model parameter c1_base. The map is established so that as the phase CAIN is more retarded, the model parameter c1_base decreases.

Effect of Partially Identifying the Model Parameters

The effect of partially identifying the model parameters will be described.

Figure 13:
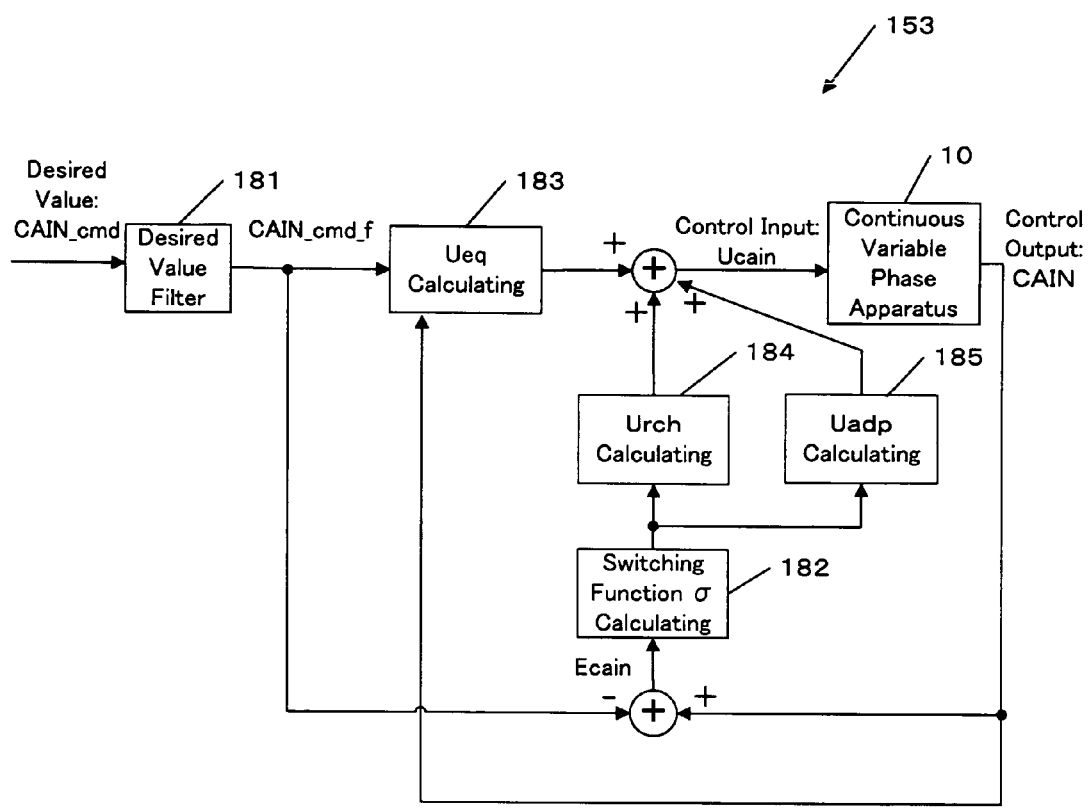
FIG. 13 is a block diagram of a control apparatus comprising a means for determining an adaptive law input instead of a partial model parameter identifier.
Figure 14:
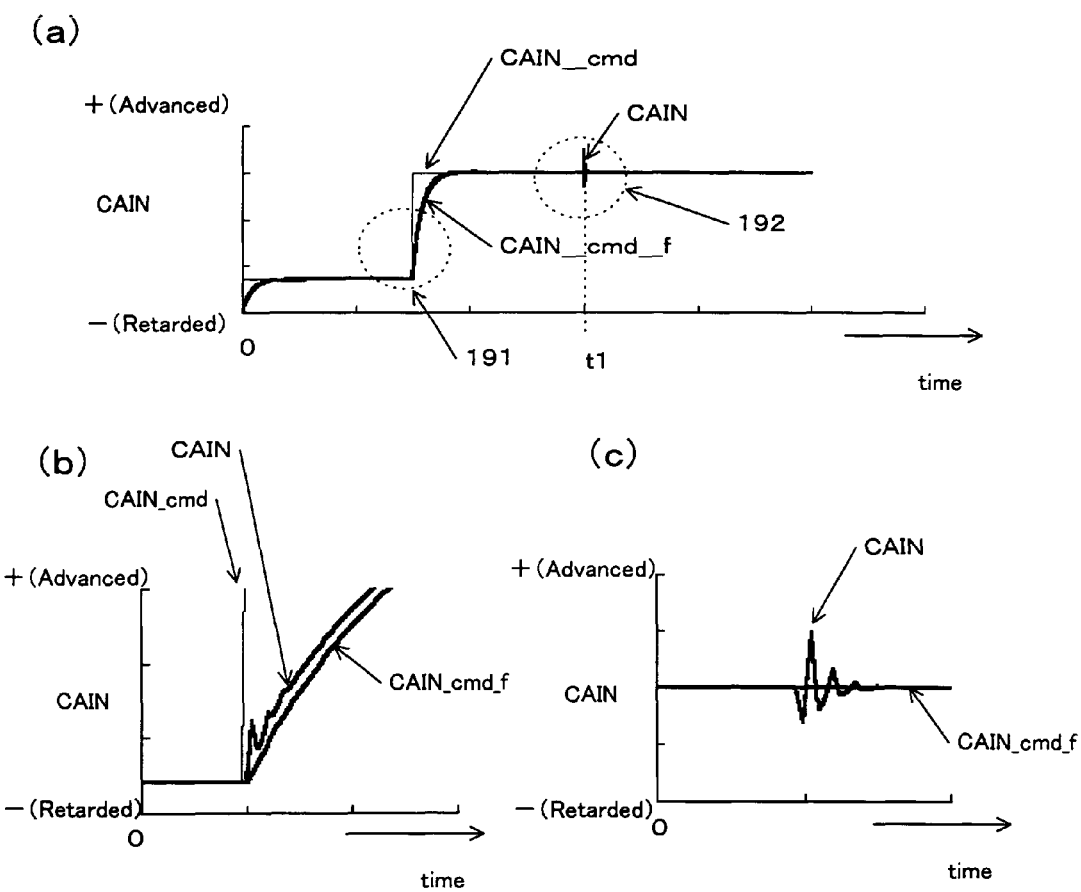
FIG. 14 shows characteristics of a control output in accordance with the apparatus shown in FIG. 13.

For comparison purpose, FIG. 13 shows a case where a means for determining an adaptive law input Uadp is provided instead of the partial model parameter identifier. FIG. 14 shows characteristics of the phase CAIN in accordance with the case shown in FIG. 13.

The adaptive law input Uadp can be determined by the equation (29).

$$Uadp = -Kadp \cdot \sum_{i=0}^{k} \sigma(i) \tag{29}$$

The adaptive law input Uadp acts to place the state quantity on the switching line while suppressing a modeling error and disturbance. The control input Ucain is determined as a sum of the equivalent control input Ueq, reaching law input Urch and adaptive law input Uadp.

FIG. 14(a) shows behavior of the desired value CAIN_cmd_f and the control output CAIN. The trajectory of the desired value is modified from CAIN_cmd to CAIN_cmd_f by the application of the desired value filter 181. CAIN_cmd_f is a desired value to which the phase CAIN should converge.

FIG. 14(b) shows an enlarged view of an area 191 of FIG. 14(a). FIG. 14(c) shows an enlarged view of an area 192 of FIG. 14(a). In the area 191, the desired value CAIN_cmd_f largely changes. In the area 192, a large vibration occurs in the control input CAIN due to disturbance applied to the phase device 10.

As shown in the area 191, a steady state error occurs between the control output CAIN and the desired value CAIN_cmd_f. As shown in the area 192, the control output CAIN changed by the disturbance converges at a higher speed. Thus, when the adaptive law input Uadp is introduced, although a good convergence characteristic against disturbance is achieved, the characteristic of following the desired value may deteriorate.

Figure 15:
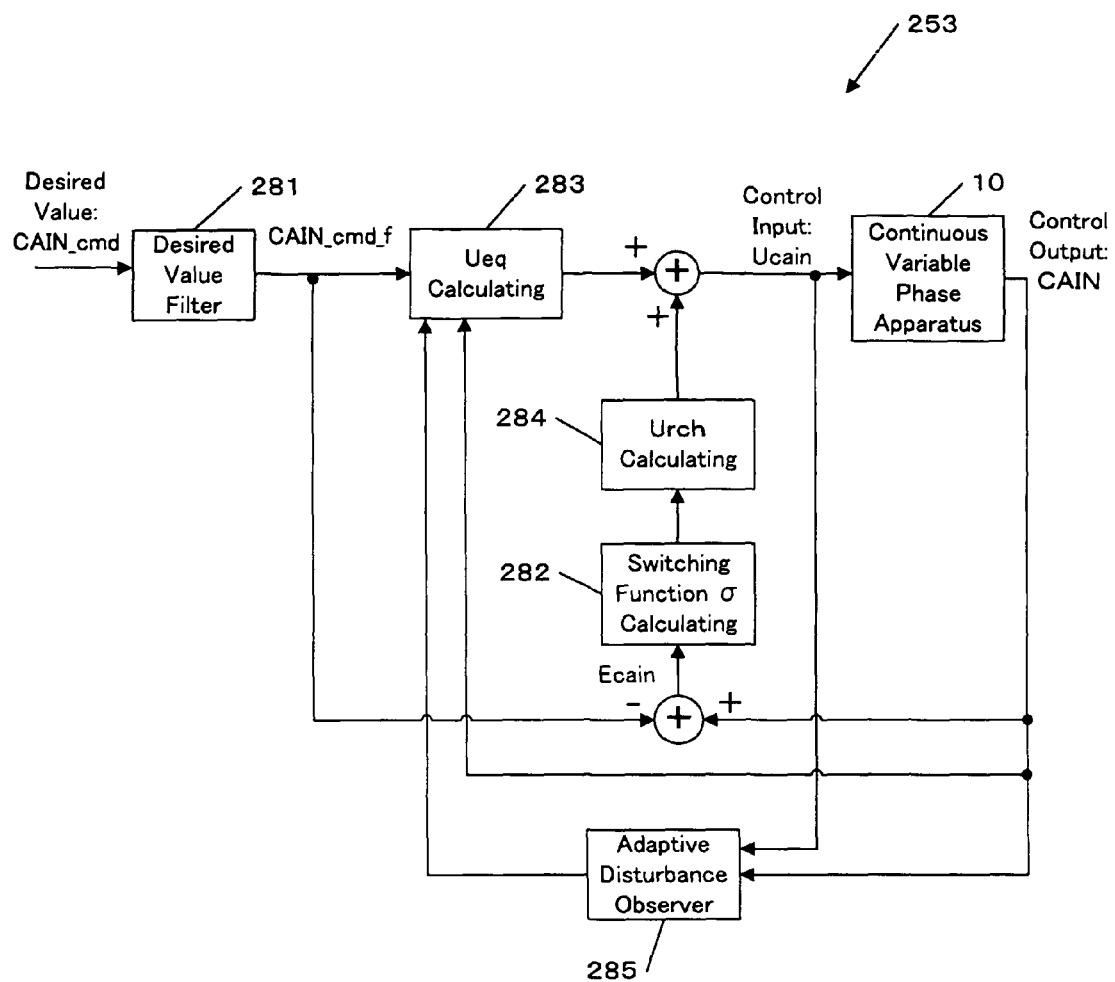
FIG. 15 is a block diagram of a control apparatus comprising an adaptive disturbance observer instead of a partial model parameter identifier.
Figure 16:
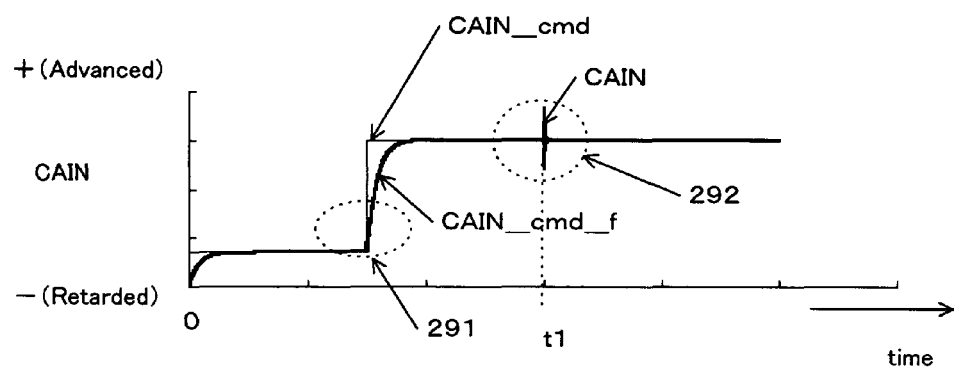
FIG. 16 shows characteristics of a control output in accordance with the apparatus shown in FIG. 15.
Figure 16:
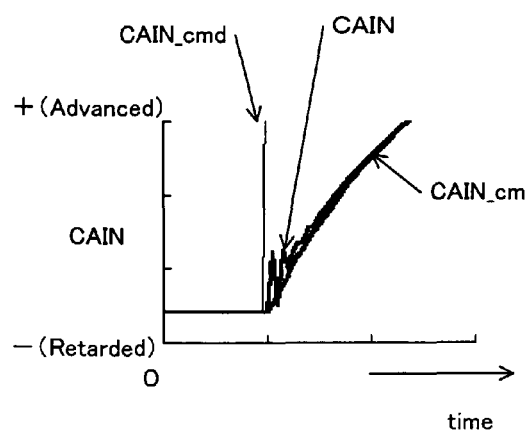
Figure 16:
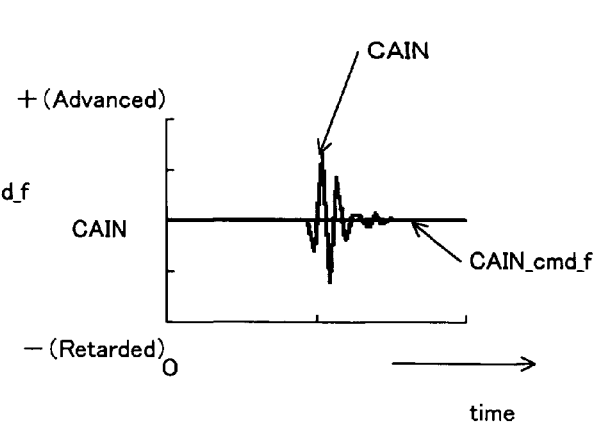

FIG. 15 shows a case where an adaptive disturbance observer 285 is provided instead of the partial model identifier. FIG. 16 shows characteristic of the phase CAIN controlled in accordance with the case shown in FIG. 15.

The adaptive disturbance observer 285 uses, for example, the least squares method to recursively identify the disturbance c1 in the equation (2) at a predetermined time interval.

FIG. 16(a) shows behavior of the desired value CAIN_cmd_f and the control output CAIN. FIG. 16(b) shows an enlarged view of an area 291 of FIG. 16(a). FIG. 16(c) shows an enlarged view of an area 292 of FIG. 16(a). In the area 291, the desired value CAIN_cmd_f largely changes. In the area 292, a large variation occurs in the control output CAIN due to disturbance applied to the phase device 10.

As shown in the area 291, a steady state error between the control output CAIN and the desired value CAIN_cmd_f is small. As shown in the area 292, the control output CAIN converges with vibration. Thus, when the adaptive disturbance observer is introduced, although following to the desired value is good, the convergence characteristic against disturbance may deteriorate.

Figure 17:
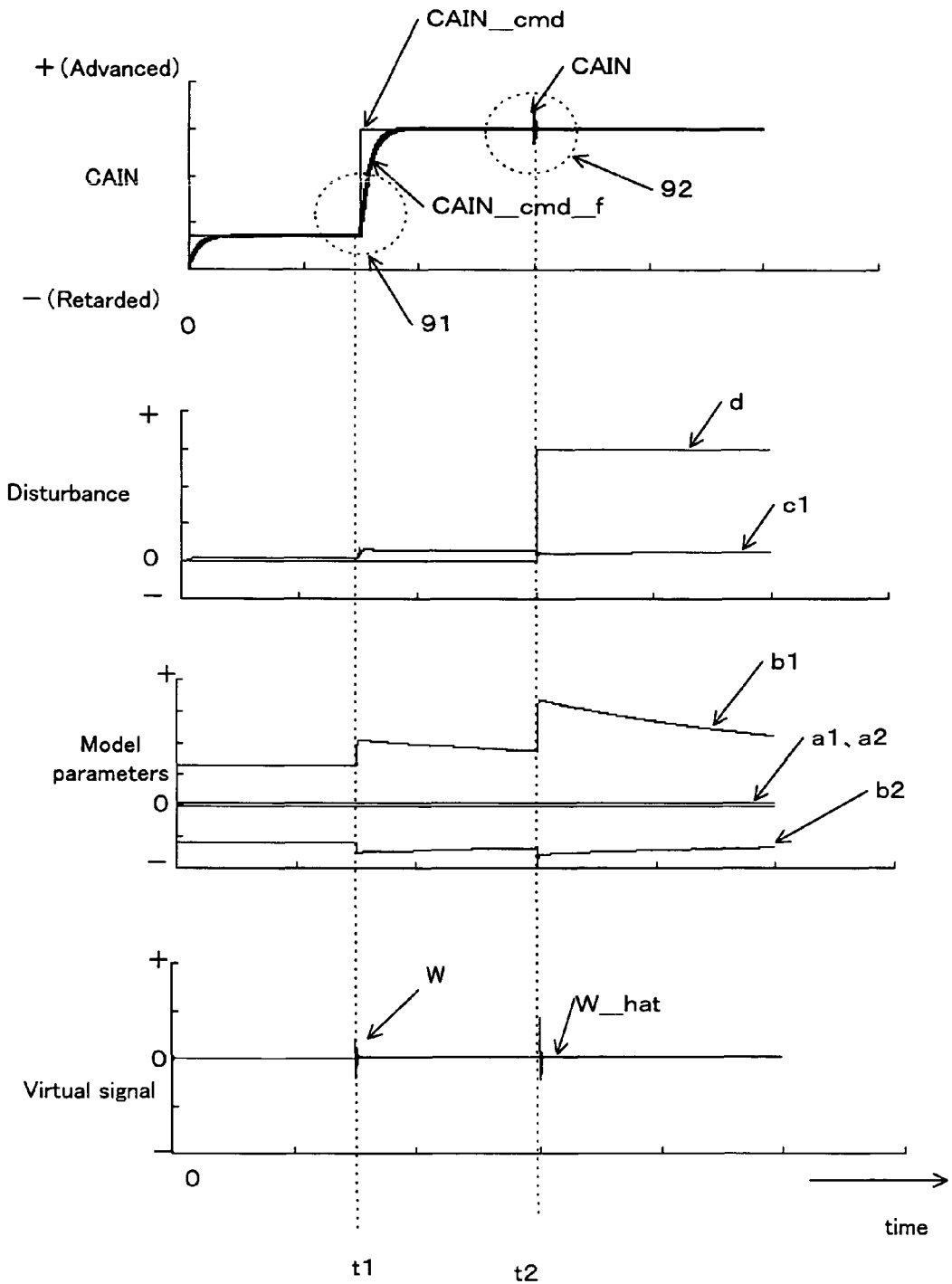
FIG. 17 shows characteristics of parameters when a partial model parameter identifier is used in accordance with one embodiment of the present invention.

FIG. 17 shows behavior of each parameter in accordance with the above second embodiment of the invention. At time t1, the desired value CAIN_cmd_f largely changes. The estimated disturbance value c1 slightly changes because the estimated disturbance value c1 compensates for a modeling error caused by the change of the desired value. At time t2, disturbance d is applied to the phase device 10. Such application of the disturbance causes a large change in the control output. The model parameters a1 and a2 are pre-identified and have a constant value. The model parameters b1 and b2 are recursively identified at a predetermined time interval. It is seen that the model parameters b1 and b2 are adaptively identified in response to the change in the desired value CAIN_cmd_f and the application of the disturbance d.

The output W of the virtual plant and the output W_hat of the model of the virtual plant change due to the change of the desired value and the application of the disturbance d.

Figure 18:
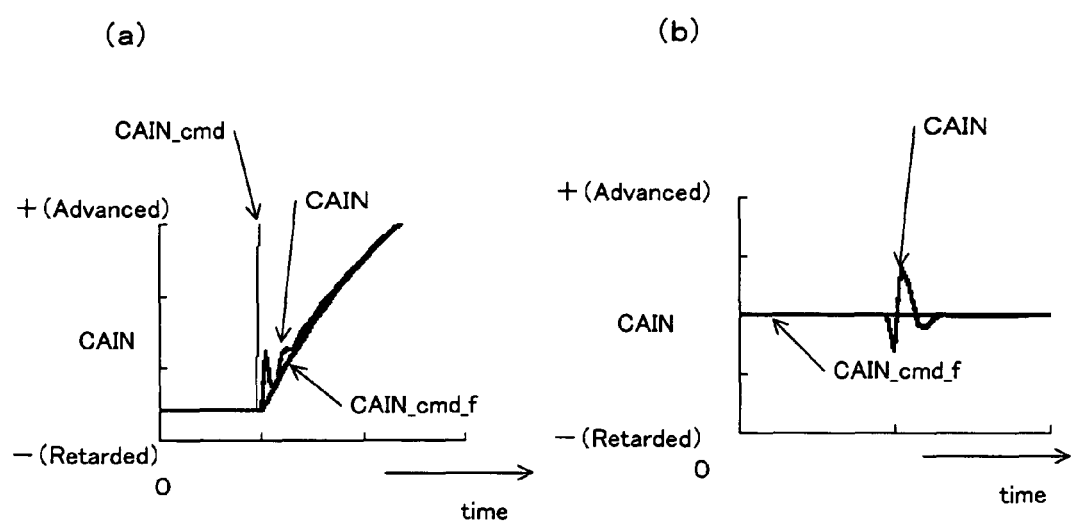
FIG. 18 is an enlarged view of a portion of the characteristics of the control output shown in FIG. 17.

FIG. 18(a) shows an enlarged view of an area 91 of FIG. 17. FIG. 18(b) shows an enlarged view of an area 92 of FIG. 17.

As shown in the area 91, a steady state error between the control output CAIN and the desired value CAIN_cmd_f is small. As shown in the area 92, the control output CAIN, which has changed due to disturbance, rapidly converges without vibration. Thus, when the partial model parameter identifier is provided, both of the characteristic of following the desired value and the convergence speed against disturbance can be improved.

The above partial model parameter identifier recursively identifies the model parameters b1, b2 and c1. In another embodiment, the model parameters a1, a2 and c1 may be recursively identified while the model parameters b1 and b2 may be pre-identified.

A method for adaptively identifying the model parameters a1, a2 and c1 will be described using as an example the partial model parameter identifier 51a in the first embodiment.

Figure 19:
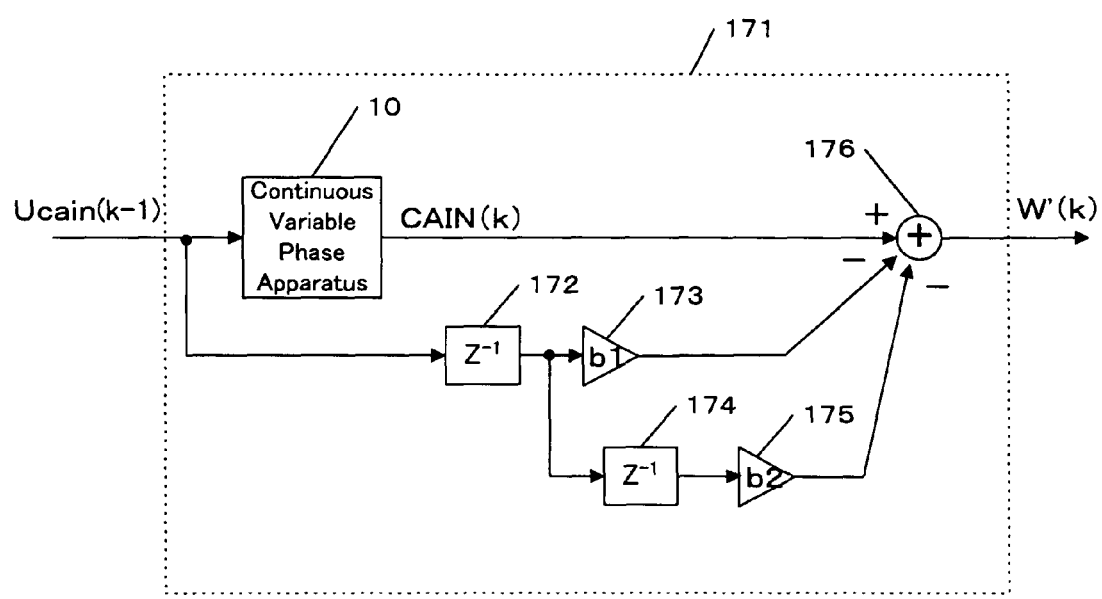
FIG. 19 shows a virtual plant for partially identifying other model parameters in accordance with one embodiment of the invention.
Figure 20:
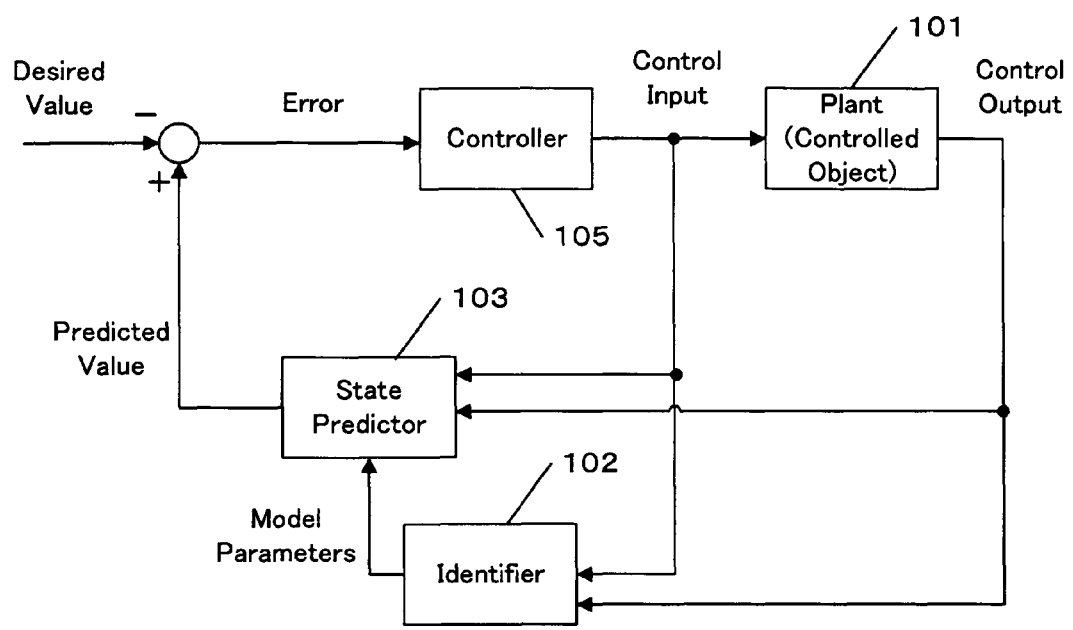
FIG. 20 shows a typical block diagram of a control apparatus for controlling an object having a dead time in accordance with a conventional scheme.

A virtual plant 171 is constructed by the above-described method. The virtual plant 171 can be shown in FIG. 19. The output W'(k) of the virtual plant 171 is expressed by the equation (30). The output W_hat''(k) of the model of the virtual plant 171 is expressed by the equation (31).

$$W'(k) = CAIN(k) - b1 \cdot Ucain(k-1) - b2 \cdot Ucain(k-2) \tag{30}$$

$$W\_hat'(k) = a1(k) \cdot CAIN(k-1) + a2(k) \cdot CAIN(k-2) + c1(k) \tag{31}$$

If there is no modeling error, the output W'(k) of the virtual plant matches the output W_hat'(k) of the model of the virtual plant.

The partial model parameter identifier 51a uses the recursive identification algorithm to identify the model parameters a1, a2 and c1 in the model expression (31) of the virtual plant 171.

The recursive identification algorithm is shown by the equation (32). The model parameter vector θ'(k) is determined in accordance with this algorithm.

$$\theta'(k)=\theta'(k-1)+KP'(k)\cdot E\_id'(k) \quad (32)$$

where $$\theta'^T(k)=[a1(k),a2(k),c1(k)] \quad (33)$$

The model parameter vector θ'(k) is determined so that the modeling error E_id'(k) is eliminated, that is, so that the output W'(k) of the virtual plant converges to the output W_hat'(k) of the model of the virtual plant.

$$E\_id'(k) = W'(k) - W\_hat'(k) \quad (34)$$

where $$W'(k) = CAIN(k) - b1 \cdot Ucain(k-1) - b2 \cdot UCain(k-2)$$

$$W\_hat'(k) = \theta'^T(k) \cdot \zeta'(k)$$
$$= a1(k) \cdot CAIN(k-1) + a2(k) \cdot$$
$$CAIN(k-2) + c1(k)$$

$$\zeta'^T(k) = [CAIN(k-1), CAIN(k-2), 1]$$

KP'(k) is a gain coefficient vector defined in the equation (35). P'(k) is determined by the equation (36).

$$KP'(k) = \frac{P'(k-1) \cdot \zeta'(k)}{1 + \zeta'^T(k) \cdot P'(k-1) \cdot \zeta'(k)} \quad (35)$$

$$P'(k) = \frac{1}{\lambda 1'}\left(I - \frac{\lambda 2' \cdot P'(k-1) \cdot \zeta'(k) \cdot \zeta'^T(k)}{\lambda 1' + \lambda 2' \cdot \zeta'^T(k) \cdot P'(k-1) \cdot \zeta'(k)}\right)P'(k-1) \quad (36)$$

where I is a unit matrix of (3×3)

The 2-degree-of-freedom sliding mode controller 53 receives the model parameters a1, a2 and c1 recursively identified by the partial model parameter identifier 51a and retrieves the model parameters b1 and b2 pre-identified and performs the 2-degree-of-freedom sliding mode control.

Thus, by constructing the virtual plant using pre-identified model parameters, one or more model parameters that are to be recursively identified can be selected among a plurality of model parameters used to represent the controlled object.

The preferred embodiments of the invention have been described. It should be noted that the phase of an exhaust cam shaft can be controlled in a similar way to the intake cam shaft.

Alternatively, a response assignment control other than the 2-degree-of-freedom sliding mode control may be used.

The above scheme of identifying one or more model parameters selected among a plurality of model parameters can be applied to various controlled objects. For example, the controlled object may be an engine. The scheme according to the invention may be applied to a control of an output of the engine. The control input may be an opening degree of the throttle valve, valve timing, a lift amount of the valve, or an opening degree of a bypass valve that is provided a passage that bypasses the throttle valve, etc. The control output may be an engine torque, engine rotational speed, or intake air amount, etc. By controlling the amount of air introduced into the engine, the engine output can be caused to converge to a desired value.

In another embodiment, the controlled object may be a system from the engine to a sensor that is provided in an exhaust passage of the engine and detects an oxygen concentration of the exhaust gas (for example, O2 sensor in FIG. 1). The scheme according to the invention may be applied to a control of an air/fuel ratio of the engine. The control input may be a parameter associated with fuel supply to the engine (for example, fuel correction amount). The control output may be the output of the sensor. By controlling the fuel supply to the engine to cause the sensor output to converge to a desired value, an appropriate air-fuel ratio control can be achieved.

In yet another embodiment, the controlled object may be a mechanical element provided in a vehicle and an actuator that drives the mechanical element. The control input may be a command to the actuator. The control output may be an amount that the mechanical element is driven by the actuator. For example, the controlled object may be an air device which is a device for adjusting the amount of air into the engine. The air device may include a throttle valve, variable valve timing mechanism, or EGR valve, etc. The control input may be a voltage or current for driving the air device. The control output may be the amount that the air device (for example, degree or lift amount) has been driven. By controlling the air device, the amount of air introduced into the engine can be appropriately controlled.

The present invention can be applied to a general-purpose engine (for example, an outboard motor).

What is claimed is:

1. A control apparatus for controlling an object that is modeled by a model equation that uses a plurality of model parameters, an input of the object and an output of the object, the plurality of model parameters including at least one first model parameter and at least one second model parameter, the model equation including at least one term that uses the first model parameter and at least one term that uses the second model parameter, comprising:
   a memory for storing the at least one predefined first model parameter;
   a partial model parameter identifier for recursively identifying the at least one second parameter based on an output from the object and an input into the object; and
   a controller for using the first model parameter and the at least one second model parameter identified by the partial model parameter identifier to determine an input into the object so that the output from the object converges to a desired value,
   the partial model parameter identifier constructing a virtual plant including the object and a component that is represented by the term using the first model parameter in the model equation, and modeling the virtual plant by a virtual model equation that uses the second model parameter and does not use the first model parameter, and
   the partial model parameter identifier further identifying the second model parameter so that an output from the virtual plant converges to an output of the model represented by the virtual model equation of the virtual plant.

2. The control apparatus of claim 1, wherein the partial model parameter identifier determines the second model parameter by adding an updating element of the second model parameter to a reference value of the second model parameter, wherein the updating element is determined so that the output of the virtual plant converges to the output of the model of the virtual plant.

3. The control apparatus of claim 2, wherein the partial model parameter identifier determines a correction amount based on a difference between the output of the virtual plant and the output of the model of the virtual plant, and adds the correction amount to a value obtained by multiplying a past value of the updating element of the second model parameter by a forgetting coefficient to determine the updating element, the forgetting coefficient being less than one.

4. The control apparatus of claim 2, wherein the partial model parameter identifier determines a plurality of the second parameters;
wherein the partial model parameter identifier determines a correction amount based on a difference between the output of the virtual plant and the output of the model of the virtual plant,
wherein the partial model parameter identifier determines, for one of the second model parameters, the updating element by adding the correction amount to a value that is obtained by multiplying a past value of the updating element by a first forgetting coefficient, the first forgetting coefficient having a value of one,
wherein the partial model parameter identifier determines, for the remaining of the second model parameters, the updating element by adding the correction amount to a value that is obtained by multiplying a past value of the updating element by a second forgetting coefficient, the second forgetting coefficient having a value less than one.

5. The control apparatus of claim 1, wherein the controller uses a response assignment control to determine the input into the object.

6. The control apparatus of claim 1, wherein the controller uses a 2-degree-of-freedom response assignment control to determine the input into the object.

7. The control apparatus of claim 1, wherein the object is a variable phase apparatus for variably controlling a phase of a camshaft of an engine,
wherein the input into the object is a command value provided to the variable phase apparatus and the output from the object is the phase of the camshaft.

8. The control apparatus of claim 1, wherein the object is an engine,
wherein the input into the object is a parameter associated with an amount of air introduced into the engine and the output from the object is a parameter associated with an output of the engine.

9. The control apparatus of claim 1, wherein the object is a system from an engine to an exhaust gas sensor provided in an exhaust passage of the engine,
wherein the input into the object is a parameter associated with fuel provided to the engine and the output from the object is an output of the exhaust gas sensor.

10. The control apparatus of claim 1, wherein the object is a mechanical element in a vehicle and an actuator for driving the mechanical element,
wherein the input into the object is a command value provided to the actuator and the output from the object is a value indicating an amount that the mechanical element has been driven.

11. A method for controlling an object that is modeled by a model equation that uses a plurality of model parameters, an input of the object and an output of the object, the plurality of model parameters including at least one first model parameter and at least one second model parameter, the model equation including at least one term that uses the first model parameter and at least one term that uses the second model parameter, comprising:
(a) storing the at least one predefined first model parameter;
(b) recursively identifying the at least one second parameter based on an output from the object and an input into the object; and
(c) using the at least one first model parameter and the at least one second model parameter recursively identified in step (b) to determine an input into the object so that the output from the object converges to a desired value,
the step (b) further comprising:
(b1) constructing a virtual plant, the virtual plant including the object and at least one component represented by the term that uses the first model parameter in the equation
(b2) modeling the virtual plant by a virtual model equation that uses the second model parameter and does not use the first model parameter and identifying the second model parameter so that an output from the virtual plant converges to an output of the model represented by the virtual model equation of the virtual plant.

12. The method of claim 11, wherein the step (b2) further comprises:
(b21) determining the second model parameter by adding an updating element of the second model parameter to a reference value of the second model parameter; and
(b22) determining the updating element so that the output of the virtual plant converges to the output of the model of the virtual plant.

13. The method of claim 12, wherein the step (b22) further comprises:
determining a correction amount based on a difference between the output of the virtual plant and the output of the model of the virtual plant; and
adding the correction amount to a value obtained by multiplying a past value of the updating element of the second model parameter by a forgetting coefficient to determine the updating element, the forgetting coefficient being less than one.

14. The method of claim 12, wherein the step (b22) further comprises;
determining a correction amount based on a difference between the output of the virtual plant and the output of the model of the virtual plant;
for one of a plurality of the second model parameters, determining the updating element by adding the correction amount to a value that is obtained by multiplying a past value of the updating element by a first forgetting coefficient, the first forgetting coefficient having a value of one; and
for the remaining of the second model parameters, determining the updating element by adding the correction amount to a value that is obtained by multiplying a past value of the updating element by a second forgetting coefficient, the second forgetting coefficient having a value less than one.

15. The method of claim 11, wherein the step (c) further comprises using a response assignment control to determine the input into the object.

16. The method of claim 11, wherein the step (c) further comprises using a 2-degree-of-freedom response assignment control to determine the input into the object.

17. The method of claim 11, wherein the object is a variable phase apparatus for variably controlling a phase of a camshaft of an engine,
   wherein the input into the object is a command value provided to the variable phase apparatus and the output from the object is the phase of the camshaft.

18. The method of claim 11, wherein the object is an engine,
   wherein the input into the object is a parameter associated with an amount of air introduced into the engine and the output from the object is a parameter associated with an output of the engine.

19. The method of claim 11, wherein the object is a system from an engine to an exhaust gas sensor provided in an exhaust passage of the engine,
   wherein the input into the object is a parameter associated with fuel provided to the engine and the output from the object is an output of the exhaust gas sensor.

20. The method of claim 11, wherein the object is a mechanical element in a vehicle and an actuator for driving the mechanical element,
   wherein the input into the object is a command value provided to the actuator and the output from the object is a value indicating an amount that the mechanical element has been driven.

* * * * *